United States Patent [19]

Itoh et al.

[11] Patent Number: 5,055,868
[45] Date of Patent: Oct. 8, 1991

[54] VARIABLE MAGNIFICATION FINDER OF REAL IMAGE TYPE

[75] Inventors: Yoshinori Itoh; Kouji Oizumi, both of Kanagawa, Japan

[73] Assignee: Canon Kabushiki Kaisha, Tokyo, Japan

[21] Appl. No.: 391,319

[22] Filed: Aug. 8, 1989

[30] Foreign Application Priority Data

Aug. 26, 1988 [JP] Japan .................................. 63-211913
Dec. 13, 1988 [JP] Japan .................................. 63-315339
Jul. 4, 1989 [JP] Japan .................................. 1-172788
Jul. 4, 1989 [JP] Japan .................................. 1-172789

[51] Int. Cl.$^5$ ............................................. G03B 13/10
[52] U.S. Cl. ..................................... 354/222; 359/676
[58] Field of Search ................ 354/222; 350/423, 519, 350/561

[56] References Cited

U.S. PATENT DOCUMENTS 2,437,032 3/1948 Korprelian ...................... 350/561 X
3,989,349 11/1976 Besenmatter et al. .......... 354/222 X

FOREIGN PATENT DOCUMENTS 47-1912 1/1972 Japan .
59-186832 12/1984 Japan .
61-156019 7/1986 Japan .

Primary Examiner—Brian W. Brown
Attorney, Agent, or Firm—Fitzpatrick, Cella, Harper & Scinto

[57] ABSTRACT

A finder device is disclosed comprising a first lens group having a positive refractive power to form a first image, a second lens group having a positive refractive power to re-form the first image, and an eyepiece lens group having a positive refractive power to observe the image the second lens group forms, wherein zooming is performed by moving the first and second lens groups along respective different loci of motion from each other.

14 Claims, 22 Drawing Sheets

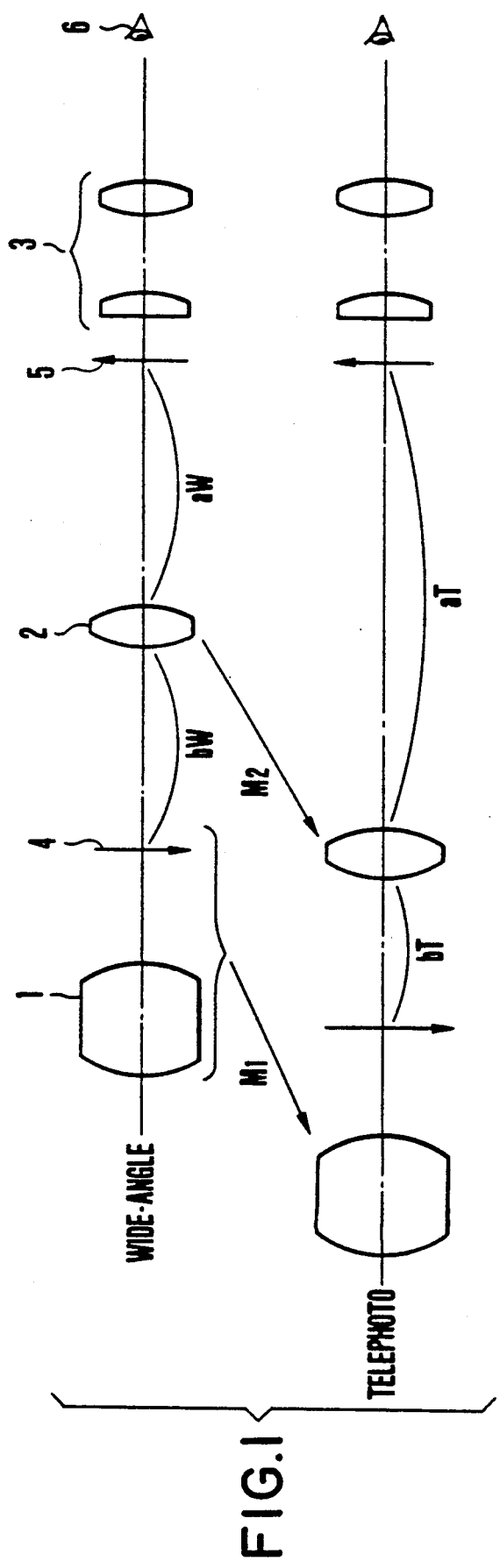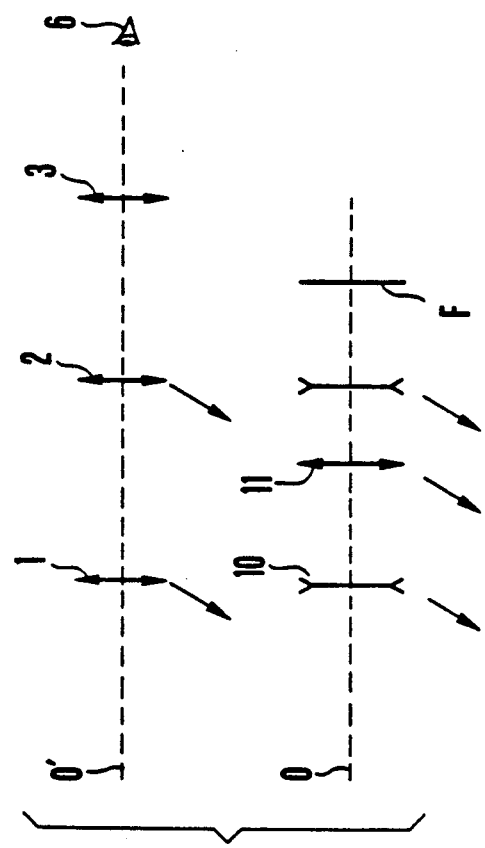

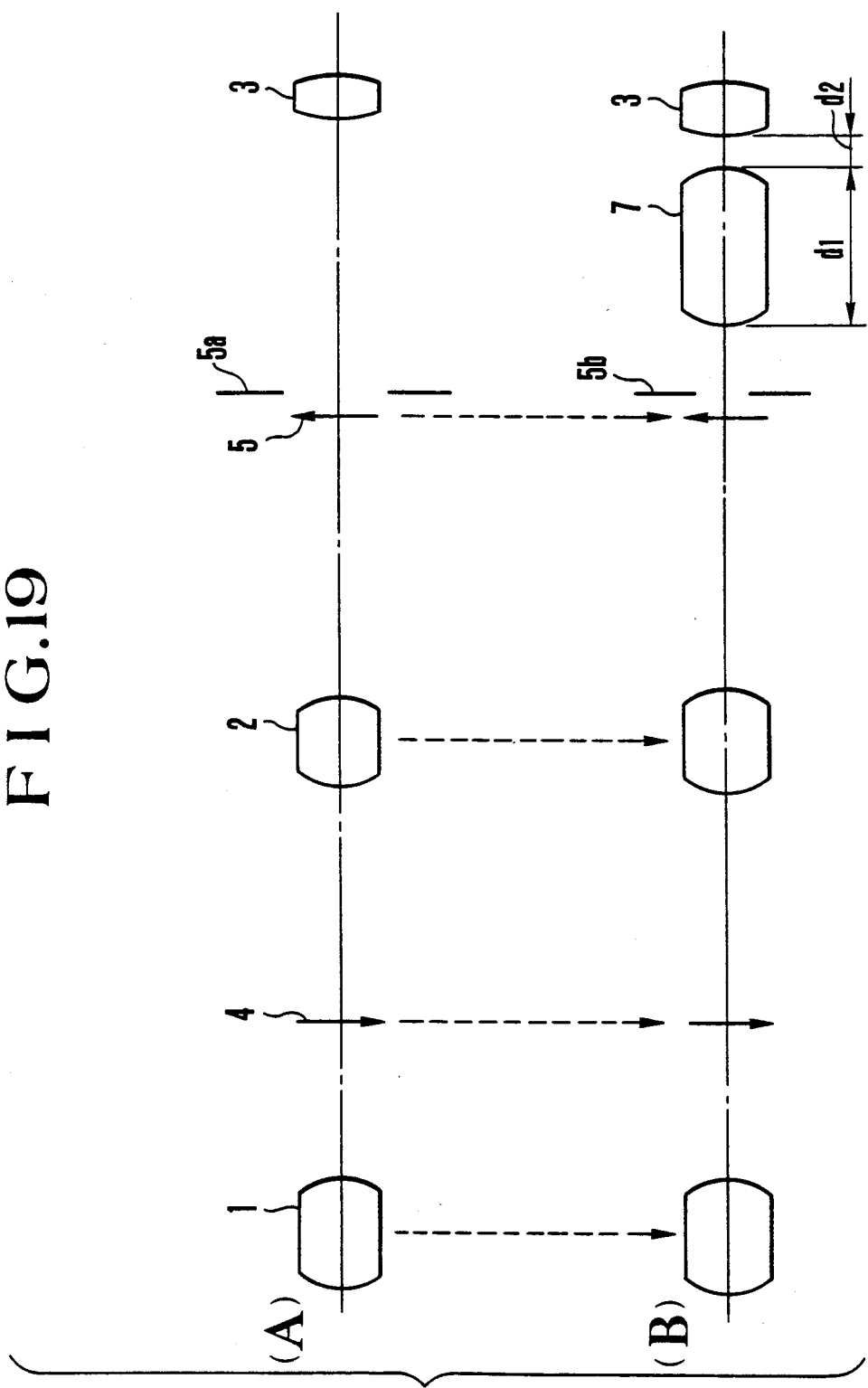

VARIABLE MAGNIFICATION FINDER OF REAL IMAGE TYPE

BACKGROUND OF THE INVENTION

1. Field of the Invention

This invention relates to real image type variable magnification finder optical systems and, more particularly, finder optical systems in separation from the photographic system or of the external type which have made it possible to observe an excellent finder image. Still more particularly, it relates to real image type variable magnification finder optical systems suited to, for example, still cameras or video cameras.

2. Description of the Related Art

With the camera having the photographic system and the finder optical system formed in separation from each other, it has been desired, on making photographs, that when the photographic system is a variable magnification system, the finder field magnification varies with variation of the magnification of an image on the film plane. Since such a variable magnification finder is to be built in the camera, it is also desirable that its size is small, and its form allows a predetermined ratio of change of the magnification to be easily obtained.

It has been well known to employ the secondary image forming type in designing a variable magnification finder optical system. Of the parts constituting the variable magnification finder optical system, the objective lens is constructed with a large number of lens groups and predetermined ones of the large number of lens groups of this objective lens are arranged to axially move to effect varying of the magnification. This is called the real image type variable magnification finder optical system and has been proposed in many forms.

Of these forms of the real image type variable magnification finder optical systems, the external form of finder optical system which is constructed in separation from the photographic system has many merits generally over the TTL type finder optical system like that in the single-lens reflex camera. For example, the finder system itself can be minimized in size. Further, the construction and arrangement of the lens elements of the finder optical system can be made with relative ease. In recent years, therefore, this form is widely used in still cameras or video cameras.

As one of the real image type variable magnification finder optical system, Japanese Laid-Open Patent Application No. Sho 61-156019, for example, proposes a real image type variable finder optical system where the objective lens is constructed with a large number of lens groups and when varying the magnification, all its air separations are made to vary.

Another real image type variable magnification finder optical system in which variation of the magnification is performed in such a manner that one of the lens groups constituting the objective lens is moved and, at the same time, one of the lens groups constituting an erector lens is also made to move by the same distance as that the objective lens moves, as, for example, proposed in Japanese Patent Publication No. Sho 47-1912.

Further, there is proposed a 2-focal length change-over form of the real image type variable magnification finder optical system in, for example. Japanese Laid-Open Utility Model Application No. Sho 59-186832 where while the primary image plane by the objective lens is made stationary, an erector lens is interchanged by another one at a position where the magnification of the erector lens takes a value of, for example, $-\sqrt{z}$, or $-1/\sqrt{z}$ (where z is the ratio of change of the magnification).

However, the real image type variable magnification finder optical system proposed in Japanese Laid-Open Patent Application No. Sho 61-156019 mentioned before has a problem that, if, as the magnification is varied by the objective lens, all the lens groups constituting the objective lens are arranged with addition of a condition that the total movement of each of the lens group is somewhat limited, the physical size of the objective lens is entirely increased and the total length of the lens becomes very long.

Also, in the real image type variable magnification finder optical system proposed in Japanese Patent Publication No. Sho 47-1912 mentioned before, it is difficult to increase the ratio of change of the magnification. There is another problem that as the ratio of change of the magnification increases, it becomes difficult to keep a constant diopter of the finder during the variation of the magnification.

Also, the real image type variable magnification finder optical system proposed in Japanese Laid-Open Utility Model Application No. Sho 59-186832 mentioned before, because the erector lens is interchanged with another one at positions where the magnification of the elector lens has values of $-\sqrt{z}$ and $-1/\sqrt{z}$, a continuous variation of the magnification cannot be obtained, thus giving rise to a problem that its technique cannot be used except only in the 2-focal length change-over form.

SUMMARY OF THE INVENTION

A first object of the invention is to provide a variable magnification finder of the real image type which enables a high ratio of change of the magnification to be obtained.

A second object is to provide a variable magnification finder which suffers little change of the diopter and whose optical performance is excellent.

And, in the present invention, a finder device comprises a first lens group having a positive refractive power to form a first image, a second lens group having a positive refractive power to re-form the first image, and an eyepiece lens group having a positive refractive power to observe the image the second lens group has formed, wherein zooming is performed by moving the first and second lens groups along respective different loci from each other.

Further objects are described below with references to the drawings:

BRIEF DESCRIPTION OF THE DRAWINGS

FIG. 1 is a schematic diagram illustrating a finder device of the invention.

FIG. 2 is a schematic diagram illustrating the relationship between the finder system of the invention and the photographic system.

FIG. 4(A) shows the aberration curves at the wide-angle end and FIG. 4(b) shows the aberration curves at the telephoto end.

FIG. 19 is schematic diagrams illustrating the paraxial optical arrangements of the main part of an embodiment of the invention when shooting with the normal format and with the half-size format.

DETAILED DESCRIPTION OF THE PREFERRED EMBODIMENTS

Figure 3:
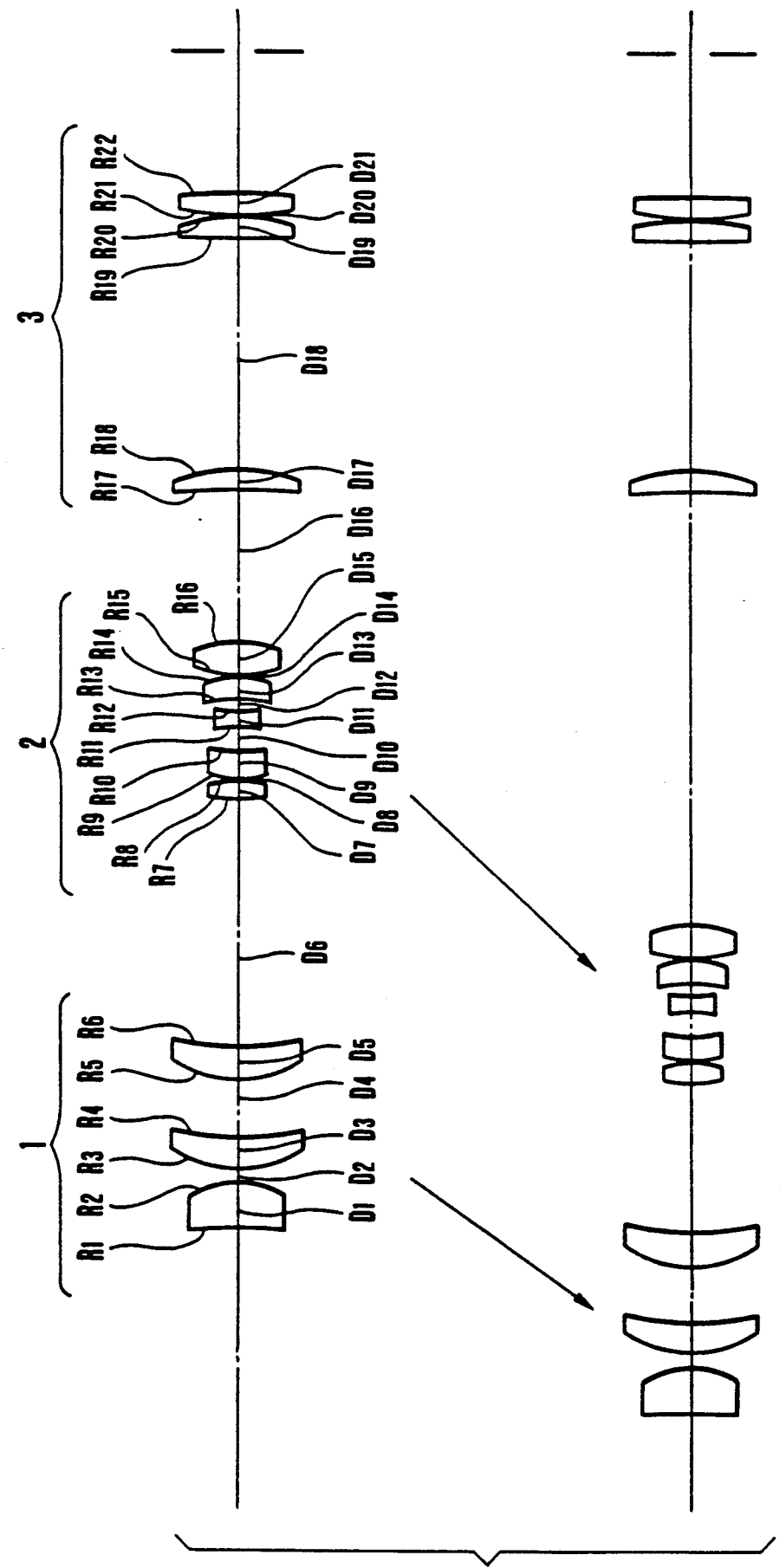
FIG. 3 is a longitudinal section view of a finder device of the invention.

The embodiments of the invention are described on the basis of the drawings.

FIG. 1 shows a schematic diagram of a real image type variable magnification finder according to the invention. An objective lens group 1 having a positive refractive power makes a predetermined image plane in a position of reference numeral 4. An erector lens group (secondary image forming lens group) 2 re-forms the image formed by the objective lens group 1 in a position of reference numeral 5. A reference numeral 3 denotes an eyepiece lens group. A reference numeral 6 denotes an eyepoint.

And, in the present embodiment, when varying magnification from the wide-angle side to the telephoto side, the objective lens group 1 is made to bodily move toward the object side, while the erector lens group 2 is made to move more than the amount of movement of the objective lens group 1. And, by this, the paraxial lateral magnification of the erector lens group 2 is increased and the position of the prescribed image plane 5 of the erector lens group 2 is meantime left unchanged so that the diopter of the finder is kept constant It should be noted that the above-described finder system of the present embodiment has a finder optical axis O' provided in separation from the optical axis O of a photographic lens system as shown in FIG. 2. And, a frontmost lens group 10 of the photographic lens concerning the present invention moves toward the object side when the magnification varies from the wide-angle side to the telephoto side. Incidentally, the photographic lens shown in the present embodiment has lens groups of negative, positive and negative powers in this order from the front which are made to move toward the object side when the magnification varies from the wide-angle side to the telephoto side.

And, to conform with this movement of the lens group 10 of the photographic lens, the objective lens group 1 is moved in the same direction, thereby giving an advantage that the eclipse by the lens group 10 is diminished, while, in the wide-angle end, a shortening of the total lengths of the photographic lens system and the finder system, which leads to a reduction in the size of the camera body, is achieved. Also, by moving the objective lens group 1 in unified, interlocking relation with the lens group 10 of the photographic lens system in the same direction, the mechanical interlocking mechanism is made easier.

The foregoing suffices for accomplishing the objects of the invention. But, to further advantageously apply it, it is desirable to satisfy the following conditions:

$$0.9 < M_1 / \left( b_T \left( \frac{f_{AT}}{F_{AT} - b_T} - 1 \right) - b_W \left( \frac{f_{AW}}{f_{AW} - b_W} - 1 \right) \right) < 1.1 \quad (1)$$

$$0.5 < -\beta_T < 8 \quad (2)$$

$$0.1 < fo/fe < 2.0 \quad (3)$$

$$3 < f_{AW} \cdot \tan\omega < 40 \quad (4)$$

where $M_1$ is the amount of movement of the objective lens group 1 from the wide-angle end to the telephoto end, $b_W$ and $b_T$ are the intervals between the primary image plane and the front principal point of the erector lens group 2 at the wide-angle end and the telephoto end respectively, $f_{AW}$ and $f_{AT}$ are the focal lengths of the erector lens group 2 at the wide-angle end and the telephoto end respectively, of is the focal length of the objective lens group 1, fe is the focal length of the eyepiece lens group 3, $\beta_T$ is the paraxial lateral magnification of the erector lens group 2 in the telephoto end, and $\omega$ is the half-angle of view at the wide-angle end. Incidentally, the unit of the inequalities (4) is (mm).

The inequalities (1) concern with the variation of the diopter as the magnification varies. When the upper or lower limit of the inequalities (1) is exceeded, the variation of the diopter in accompaniment with the variation of the magnification exceeds the allowable range. This is objectionable.

The inequalities (2) concern with the magnification of the erector lens group at the telephoto end. When the upper limit of the inequalities (2) is exceeded, the magnification becomes too large so that it gets harder to well correct the various aberrations, particularly the curvature of field. When the lower limit is exceeded, because the magnification is small, the system that has to obtain the predetermined finder magnification becomes objectionably large.

When the upper limit of the inequalities (3) is exceeded, because the focal length of the eyepiece lens group is too short, it becomes difficult to well correct the various aberrations, particularly the curvature of field. When the lower limit is exceeded, the finder magnification becomes small and the total length of the finder becomes too long objectionably.

When the upper limit of the inequalities (4) is exceeded, because the focal length of the erector lens group becomes too long, the total length gets longer, causing the whole camera to increase in size. When the lower limit is exceeded, because the focal length of the erector lens group becomes too short, it gets harder to well correct the aberrations, particularly the curvature of field which inclines to the positive direction.

To achieve a further improvement, it is desirable that the objective lens group 1 is constructed as comprising, from front to rear, a positive first lens convex toward the eyepoint side, a positive meniscus-shaped second lens convex toward the object side, and a positive meniscus-shaped third lens convex toward the object side.

The R1 surface of the frontmost side of the aforesaid first lens is of weak concave curvature, for the size of the entire system is minimized and good correction of the various aberrations is maintained. In this sense, a strong convex curvature is not favorable. So, a weak convex surface or concave surface is desirable.

The aforesaid third lens is arranged adjacent the primary image plane to bend the off-axial rays of light toward the optical axis. Thus, it plays a role of a field lens in order to keep an appropriate size of the erector lens group 2. Particularly for good stability of distortion, it is desirable that the front surface of this lens is of convex curvature toward the object side. It is also to be noted that this lens may be located on whichever side of the primary image plane, on the object side or on the eyepoint side, provided it lies in neighborhood of the primary image plane. Therefore, even if the third lens is positioned on the eyepoint side, no trouble will arise.

Meanwhile, as to the construction of the erector lens group 2, it is desirable that it comprises, from front to rear, a bi-convex first lens, a second lens in the form of a meniscus positive lens convex toward the object side, a bi-concave third lens, a fourth lens in the form of a meniscus positive lens convex toward the eyepoint side, and a bi-convex fifth lens.

The configuration of the erector lens group 2, on aberration correction, is preferably nearly symmetry. Also, in the case of such a construction and arrangement of the lenses as in the present embodiment, it is desirable that the spacing between the second lens and the third lens is longer than that between the third lens and the fourth lens.

Though, in the present embodiment, use is made of the field lens as arranged adjacent the secondary image plane to keep the appropriate size of the eyepiece lens system, there are even some cases where this is possible to remove depending on the way the rays of light pass. Incidentally, the present embodiment is considered with this field lens as included in the eyepiece system.

The eyepiece lens group 3 is desired to comprise, from front to rear, the aforesaid field lens (a first lens), a bi-convex second lens whose curvature is stronger on the eyepoint side and a bi-convex third lens whose curvature is stronger on the object side.

Incidentally, if the eyepiece lens uses an aspheric surface, it is also possible to construct it from only one lens.

Numerical examples 1 and 2 of the invention are shown below. In the numerical examples 1 and 2, Ri represents the radius of curvature of the i-th lens surfaces counting from the object side, Di the i-th lens thickness or air separation counting from the object side, and Ni and $\nu i$ are respectively the refractive index and Abbe number of the glass of the i-th lens counting from the object side.

Figure 4A:
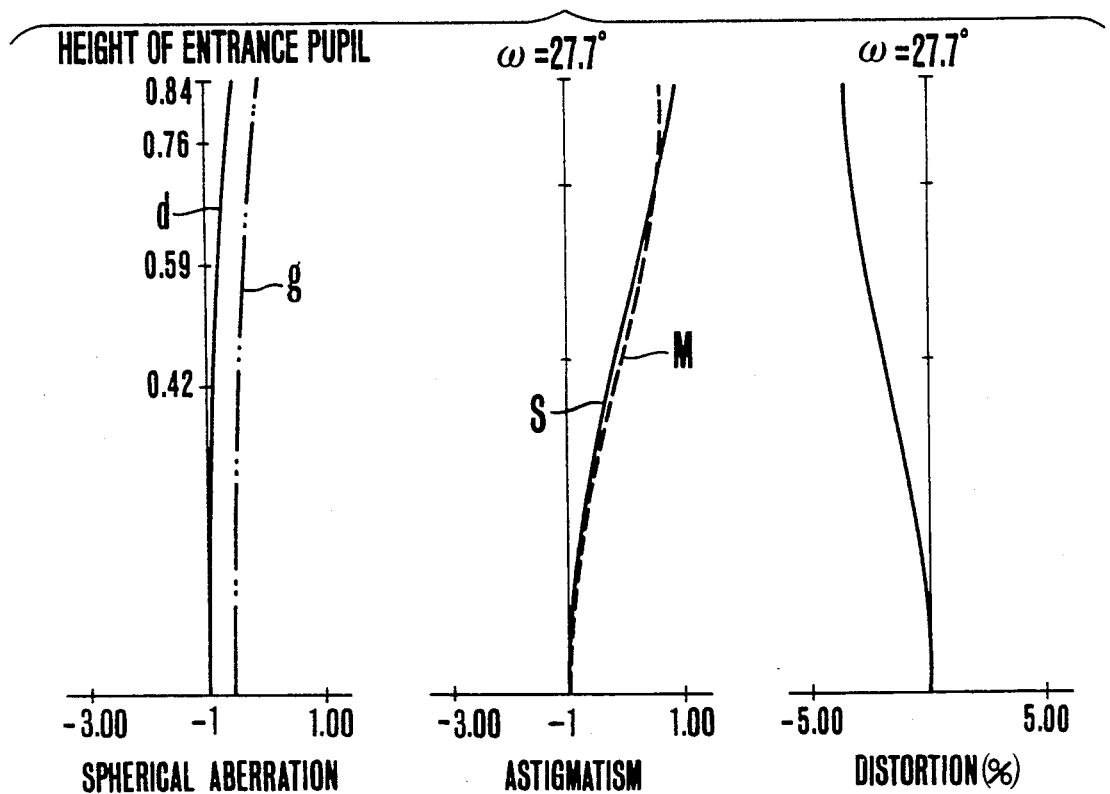
FIGS. 4(A) and 4(B) are graphs of the various aberrations of the finder device shown in FIG. 3. In these figures.
Figure 4B:
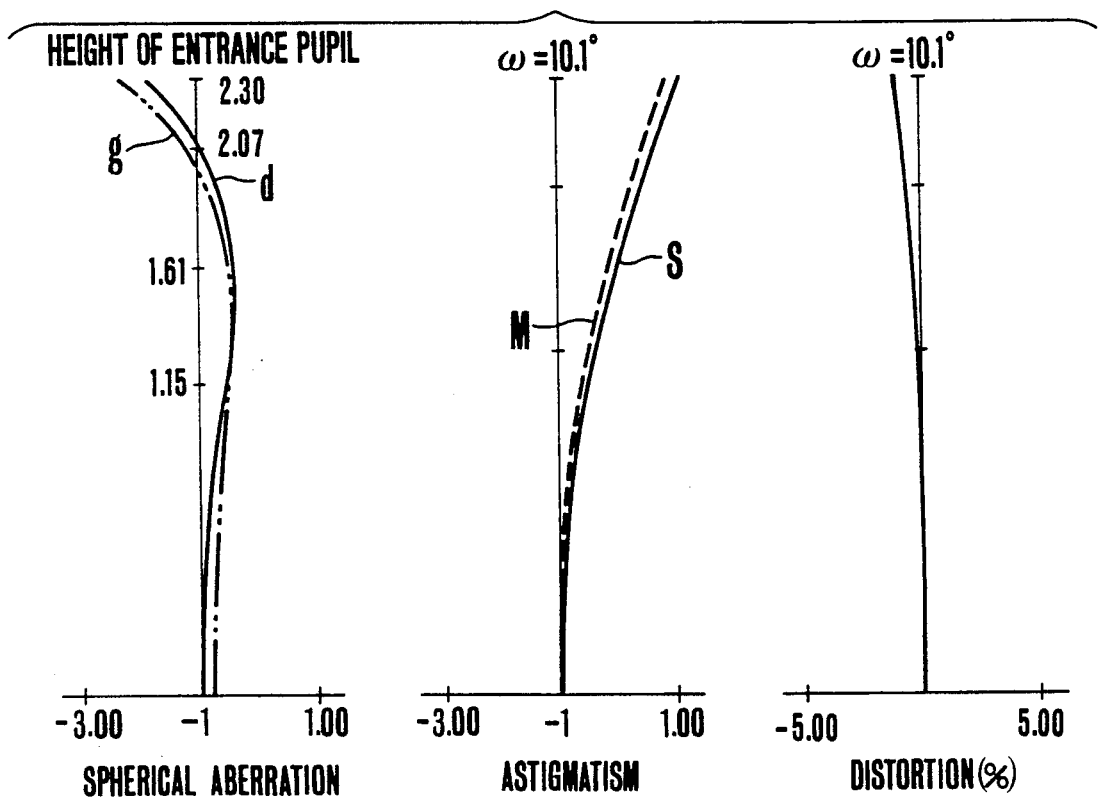

Numerical Example 1 (FIGS. 3, 4(A) and 4(B)):
$2\omega = 55.4°–70.1°$

| R1 = −94.230 | D1 = 5.81 | N1 = 1.51633 | $\nu1$ = 64.1 |
|---|---|---|---|
| R2 = −9.648 | D2 = 1.86 | | |
| R3 = 14.432 | D3 = 3.51 | N2 = 1.51633 | $\nu2$ = 64.1 |
| R4 = 29.228 | D4 = 6.85 | | |
| R5 = 12.737 | D5 = 3.98 | N3 = 1.77250 | $\nu3$ = 49.6 |
| R6 = 21.439 | D6 = Variable | | |
| R7 = 15.692 | D7 = 2.50 | N4 = 1.60311 | $\nu4$ = 60.7 |
| R8 = −18.888 | D8 = 0.20 | | |
| R9 = 8.254 | D9 = 3.00 | N5 = 1.60311 | $\nu5$ = 60.7 |
| R10 = 12.454 | D10 = 2.95 | | |
| R11 = −11.280 | D11 = 2.00 | N6 = 1.84666 | $\nu6$ = 23.9 |
| R12 = 8.309 | D12 = 1.40 | | |
| R13 = −16.690 | D13 = 3.00 | N7 = 1.71300 | $\nu7$ = 53.8 |
| R14 = −10.741 | D14 = 0.20 | | |
| R15 = 18.715 | D15 = 4.00 | N8 = 1.48749 | $\nu8$ = 70.2 |
| R16 = −13.247 | D16 = Variable | | |
| R17 = −107.395 | D17 = 2.65 | N9 = 1.50137 | $\nu9$ = 56.4 |
| R18 = −18.000 | D18 = 27.10 | | |
| R19 = 200.000 | D19 = 2.50 | N10 = 1.48171 | $\nu10$ = 57.4 |
| R20 = −34.000 | D20 = 0.30 | | |
| R21 = 34.000 | D21 = 2.50 | N11 = 1.49171 | $\nu11$ = 57.4 |
| R22 = −200.000 | D22 = 17.00 | | |
| R23 = 0.0 | | | |

| $2\omega$ | paraxial Magnification | D6 | D16 | Magnification of Erector Lens Group |
|---|---|---|---|---|
| 55.4° | 0.423 | 29.936 | 18.038 | −1.04 |
| 20.1° | 11.43 | 18.186 | 52.037 | −2.80 |

$$M_1 / \left\{ b_T \left( \frac{f_{AT}}{f_{AT} - b_T} - 1 \right) - b_W \left( \frac{f_{AW}}{f_{AW} - b_W} - 1 \right) \right\} = 1.00$$

$-\beta_T = 2.80$
$f_o/f_e = 0.41$
$f_{AW} \cdot \tan \omega = 10.13$ (mm)

Figure 5:
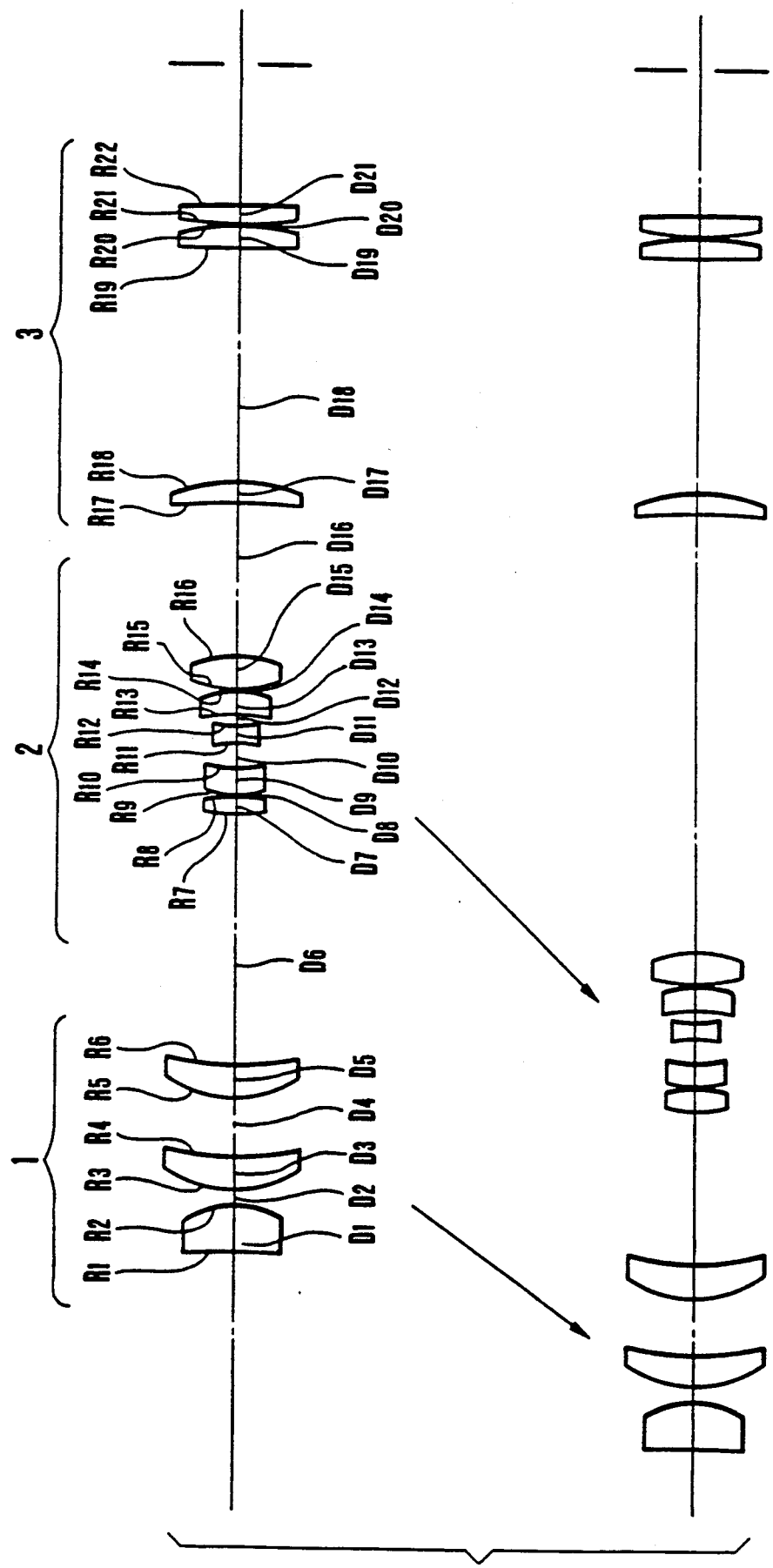
FIG. 5 is a longitudinal section view of another finder device of the invention.
Figure 6A:
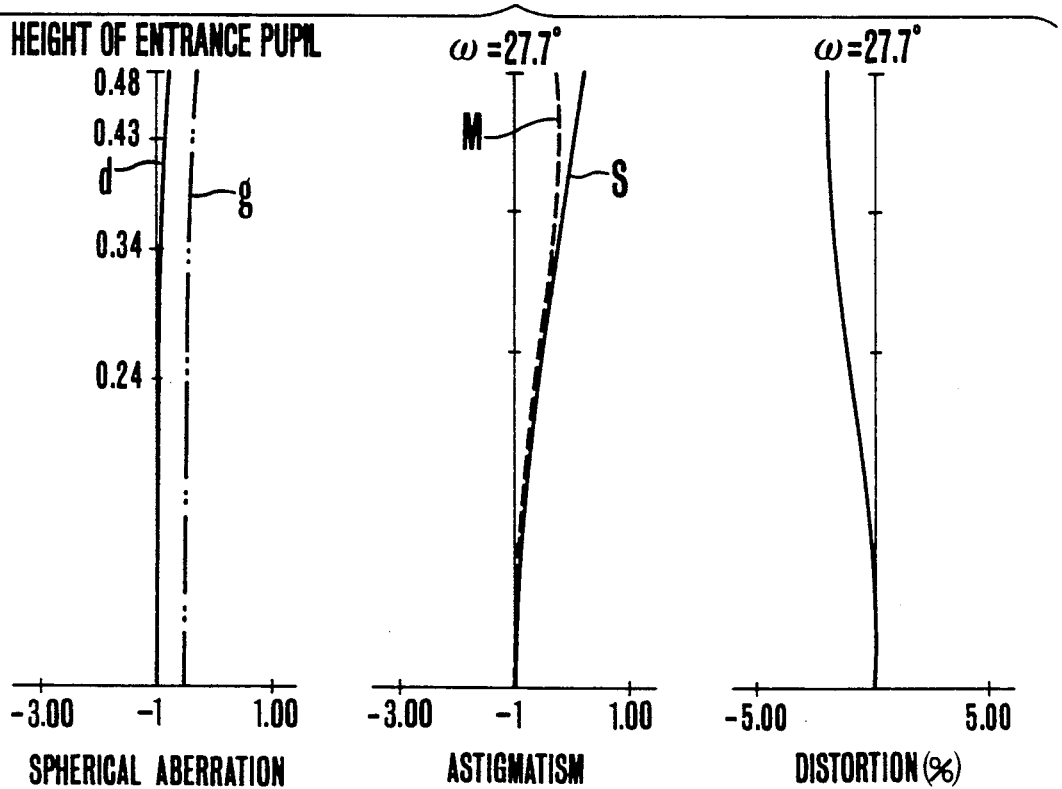
FIGS. 6(A) and 6(B) are graphs of the various aberrations of the finder device shown in FIG. 5, FIG. 6(A) showing the aberration curves at the wide-angle end, and FIG. 6(B) showing the aberration curves at the telephoto end.
Figure 6B:
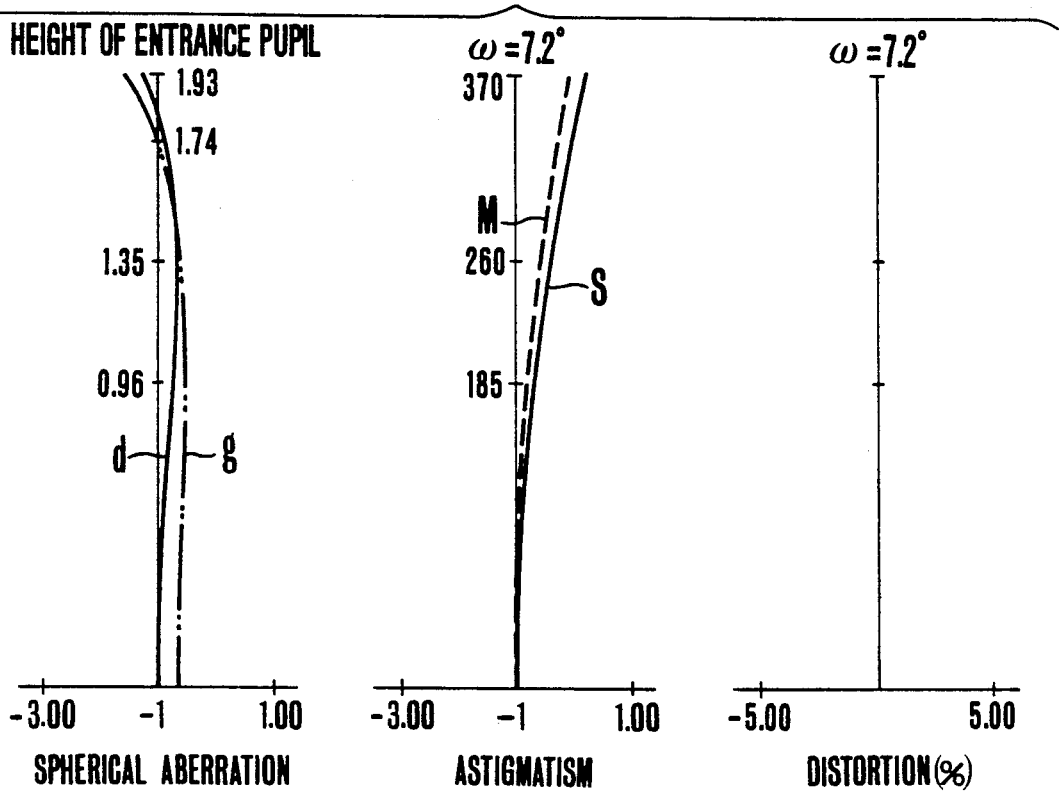

Numerical Example 2 (FIGS. 5, 6(A) and 6(B)):
$2\omega = 55.4°–14.3°$

| R1 = −93.278 | D1 = 5.16 | N1 = 1.77250 | $\nu1$ = 49.6 |
|---|---|---|---|
| R2 = −12.851 | D2 = 2.00 | | |
| R3 = 22.240 | D3 = 4.20 | N2 = 1.77250 | $\nu2$ = 49.6 |
| R4 = 26.402 | D4 = 5.00 | | |
| R5 = 12.535 | D5 = 4.21 | N3 = 1.77250 | $\nu3$ = 49.6 |
| R6 = 27.434 | D6 = Variable | | |
| R7 = 18.360 | D7 = 2.73 | N4 = 1.60311 | $\nu4$ = 60.7 |
| R8 = 20.825 | D8 = 0.22 | | |
| R9 = 9.462 | D9 = 3.27 | N5 = 1.60311 | $\nu5$ = 60.7 |
| R10 = 13.507 | D10 = 3.09 | | |
| R11 = −13.076 | D11 = 2.18 | N6 = 1.84666 | $\nu6$ = 23.9 |
| R12 = 10.988 | D12 = 1.40 | | |
| R13 = −25.192 | D13 = 3.27 | N7 = 1.60311 | $\nu7$ = 60.7 |
| R14 = −13.379 | D14 = 0.22 | | |
| R15 = 29.041 | D15 = 4.37 | N8 = 1.60311 | $\nu8$ = 60.7 |
| R16 = −17.864 | D16 = Variable | | |
| R17 = 0.0 | D17 = 2.65 | N9 = 1.49171 | $\nu9$ = 57.4 |
| R18 = −21.000 | D18 = 27.10 | | |
| R19 = 200.000 | D19 = 2.50 | N10 = 1.49171 | $\nu10$ = 57.4 |
| R20 = −34.000 | D20 = 0.30 | | |
| R21 = 34.000 | D21 = 2.50 | N11 = 1.49171 | $\nu11$ = 57.4 |
| R22 = −200.000 | D22 = 17.00 | | |

| $2\omega$ | Paraxial Magnification | D6 | D16 | Magnification Of Erector Lens Group |
|---|---|---|---|---|
| 55.4° | 0.32 | 41.591 | 21.601 | −0.79 |
| 14.3° | 1.29 | 17.015 | 67.044 | −3.18 |

$$M_1 / \left\{ b_T \left( \frac{f_{AT}}{f_{AT} - b_T} - 1 \right) - b_W \left( \frac{f_{AW}}{f_{AW} - b_W} - 1 \right) \right\} = 1.01$$

-continued $$-\beta_T = 3.16$$
$$f_o/f_e = 0.41$$
$$f_4H' \cdot \tan \omega = 11.06 \text{ (mm)}$$

Next, another embodiment of an external form of the real image type magnification finder where the lateral magnifications for the wide-angle end and telephoto end of the erector lens group are set to such appropriate values that the ratio of change of the magnification is high and, despite the high magnification, the total length of the lens is relatively short. This embodiment is described with reference to FIGS. 7 to 10. Incidentally, in the following figures, the same elements as those shown in FIG. 1 are denoted by the same reference numerals.

In the present embodiment, when the magnification is varied in such a manner that the objective lens group 1 is moved while the erector lens group 2 is simultaneously moved so that the first finder image formed by the objective lens group 1 is re-formed on the secondary image plane 5, the following conditions are satisfied:

$$0.1 < -\beta_W < 1 \tag{5}$$

$$1 < -\beta_T < 7 \tag{6}$$

where $\beta_W$ and $\beta_T$ are the lateral magnifications of the erector lens groups 2 in the wide-angle end and the telephoto end respectively.

By this, the requirement of shortening the total length of the lens and the requirement of increasing the ratio of change of the magnification in such a manner that even when varying the magnification, the variation of the total length of the lens is lessened.

FIG. 7 to FIG. 10 are lens block diagrams of numerical examples 3 to 6 of the invention to be described later, and FIGS. 11(A), 11(B) and 11(C) to FIGS. 14(A), 14(B) and 14(C) are graphic representations of the various aberrations of the numerical examples 3 to 6 of the invention. In the lens block diagrams and the aberrations curves, (A) represents the wide angle-end, (B) an intermediate position, and (C) the telephoto end.

First and second field lenses 1b and 3b respectively, in the numerical examples 3 to 5 (FIG. 7 to FIG. 9), are used as positioned adjacent the primary and secondary image planes respectively. In the numerical example 6 (FIG. 10), only one or first a field lens 1b is used as positioned adjacent the primary image plane.

The first field lens 1b conducts a light beam originating from the first finder image formed on the primary image plane 4 to behind it or to the erector lens group 2 with a good efficiency. Also, the second field lens 3b conducts a light beam originating from the finder image to the eyepoint 6 with a good efficiency.

Figure 7:
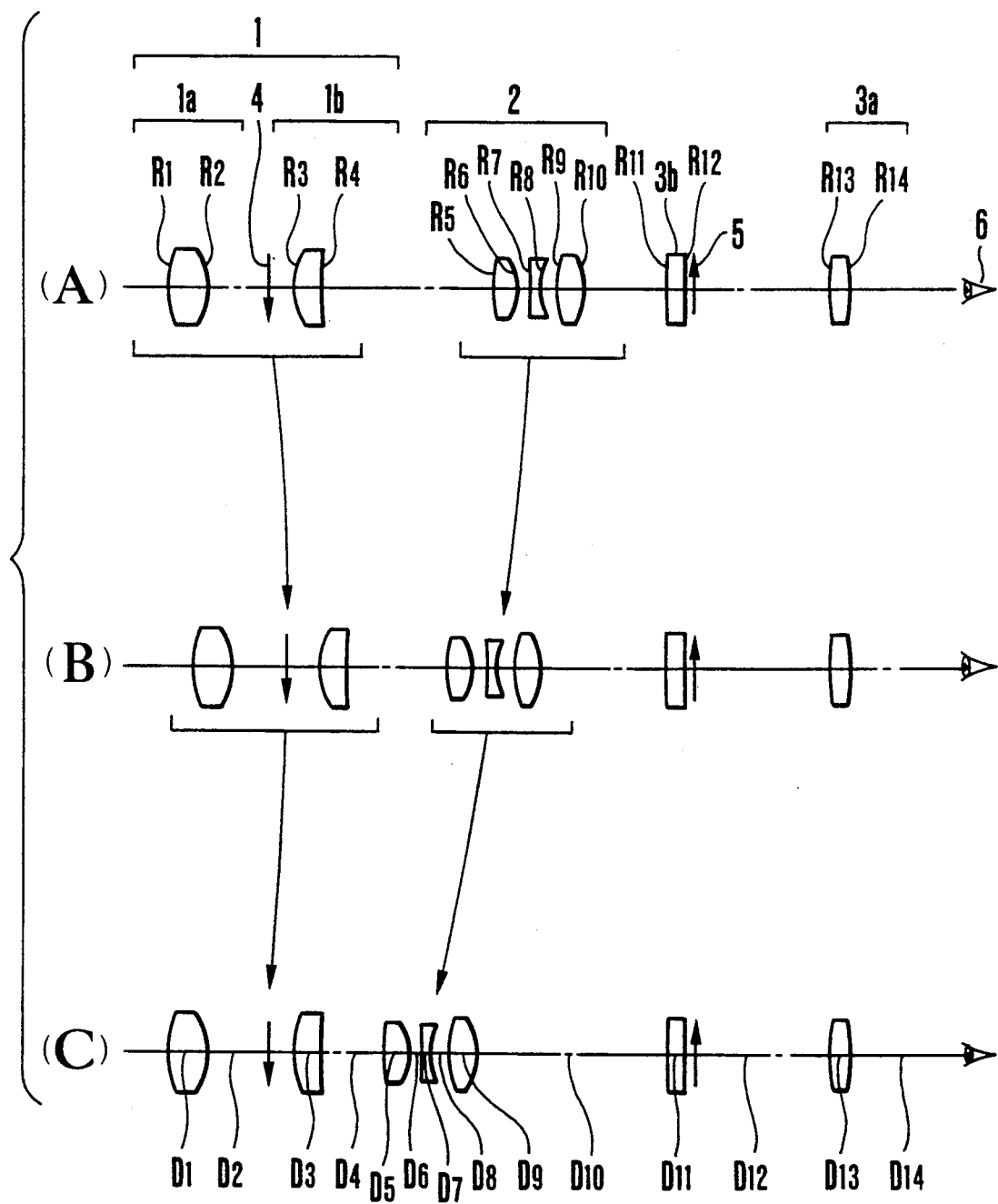
FIGS. 7, 8, 9 and 10 are lens block diagrams of finder devices of the invention.
Figure 8:
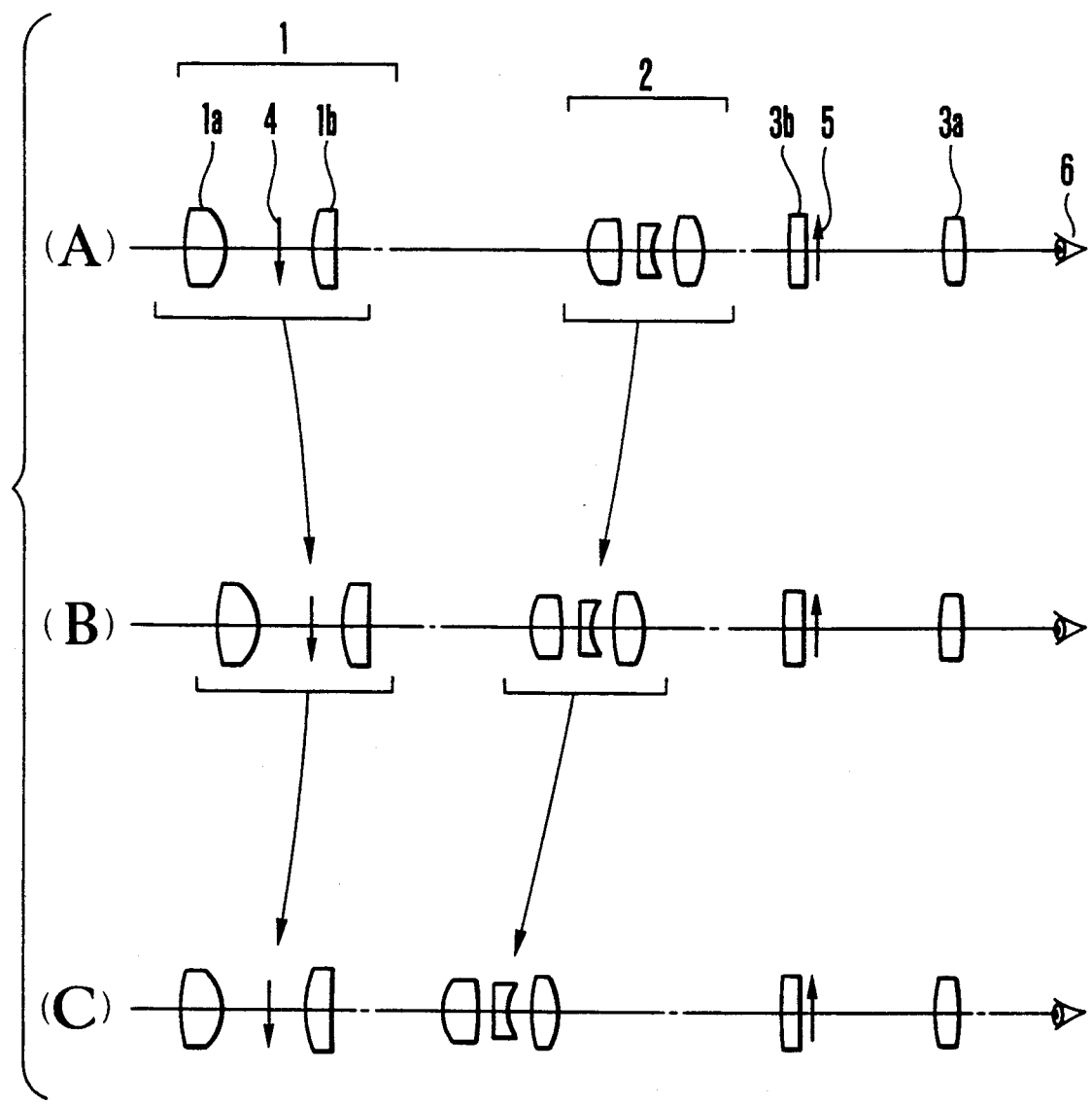
Figure 9:
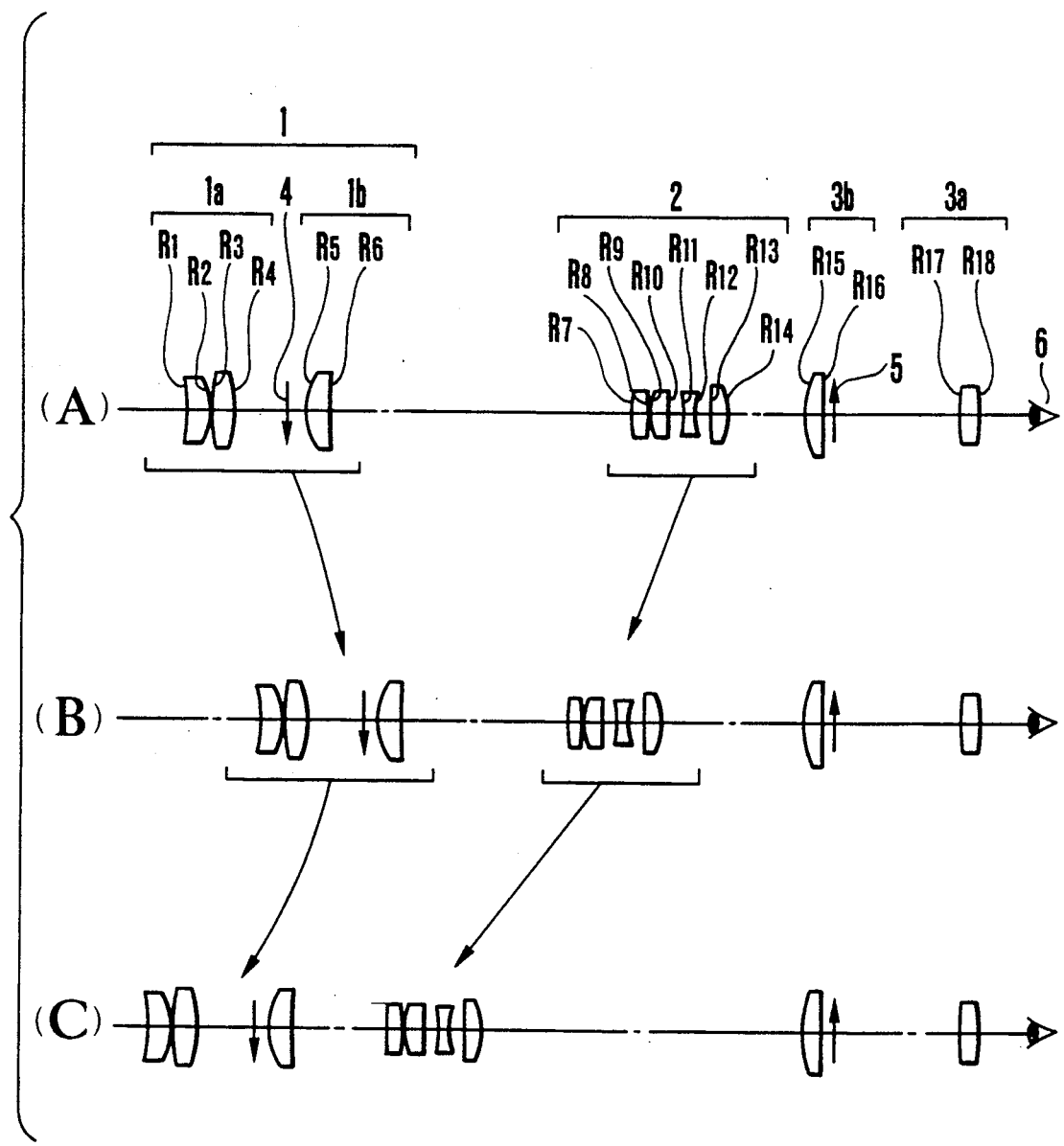
Figure 10:
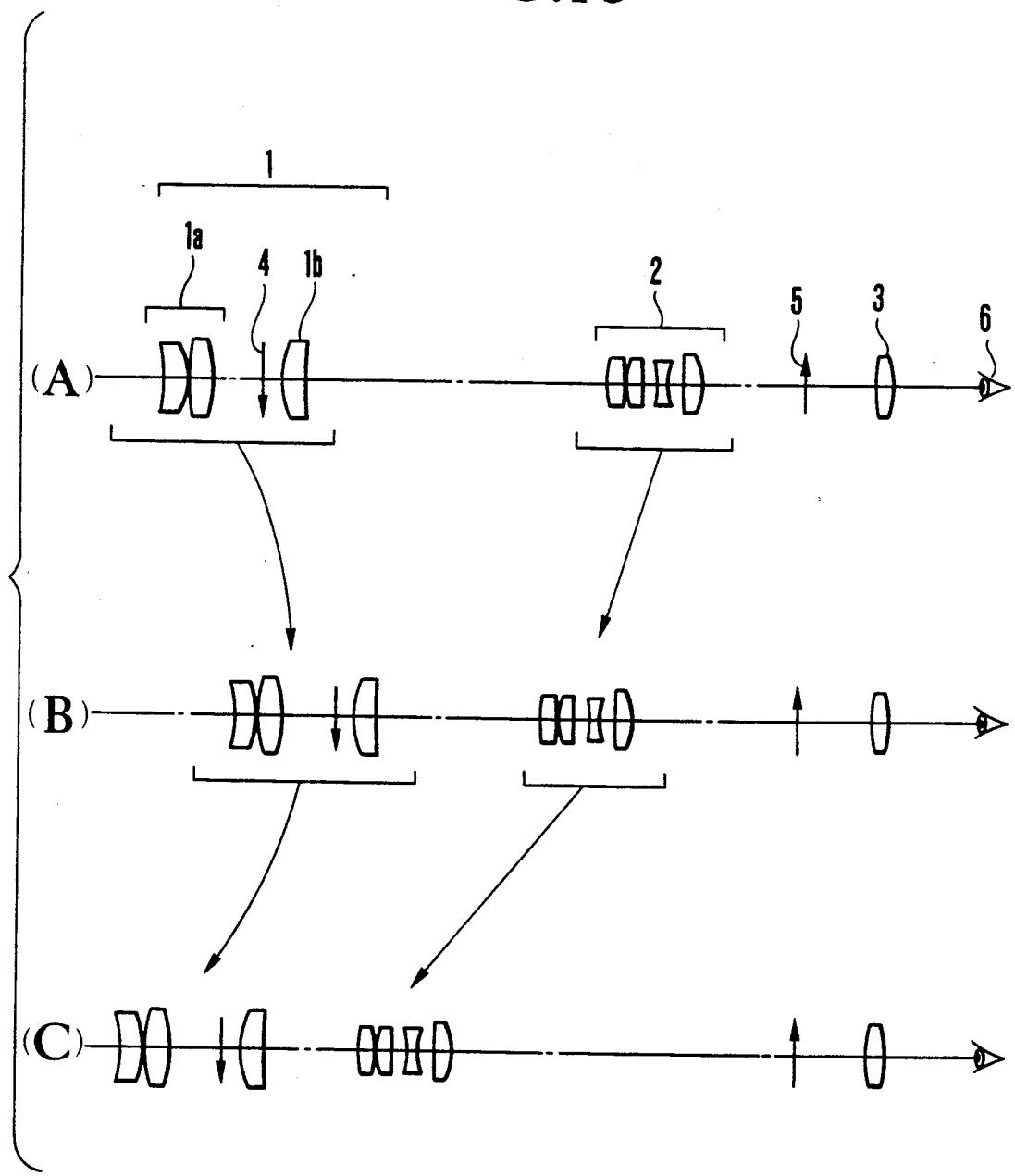
Figure 11A:
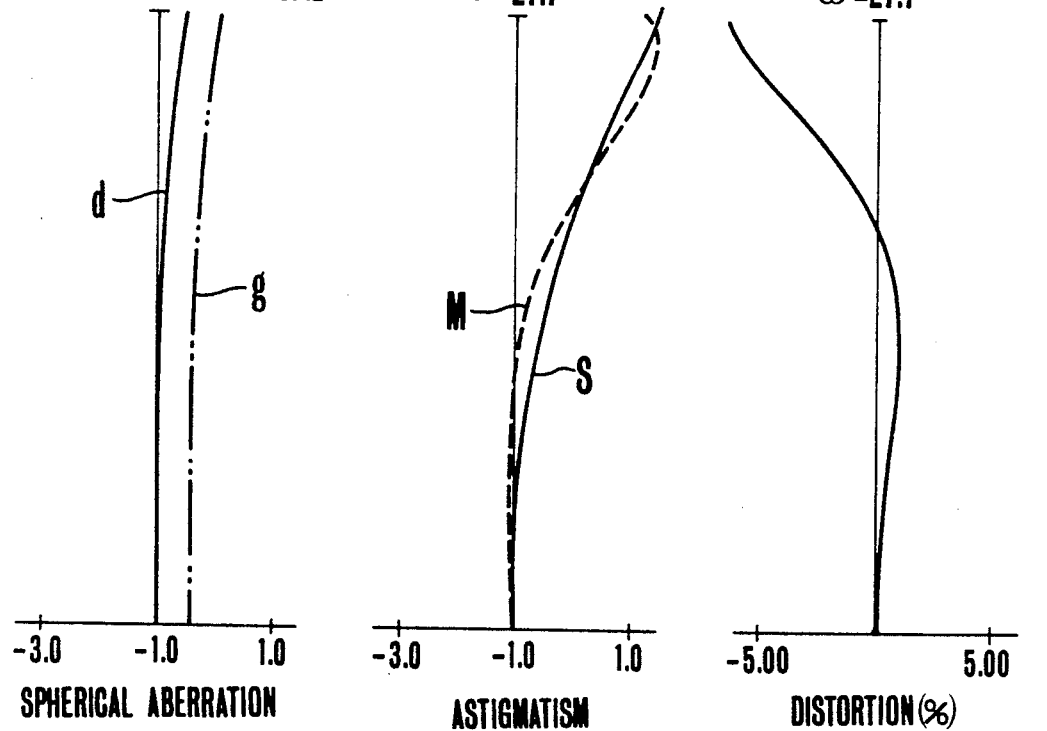
FIGS. 11(A) to 11(C), 12(A) to 12(C), 13(A) to 13(B) and 14(A) to 14(C) are graphs of the various aberrations of the finder devices shown in FIGS. 7, 8, 9 and 10 respectively, FIGS. 11(A), 12(A), 13(A) and 14(A); 11(B), 12(B), 13(B) and 14(B); and 11(C), 12(C), 13(C) and 14(C) showing the aberration curves respectively at the wide-angle, intermediate and telephoto positions.
Figure 11B:
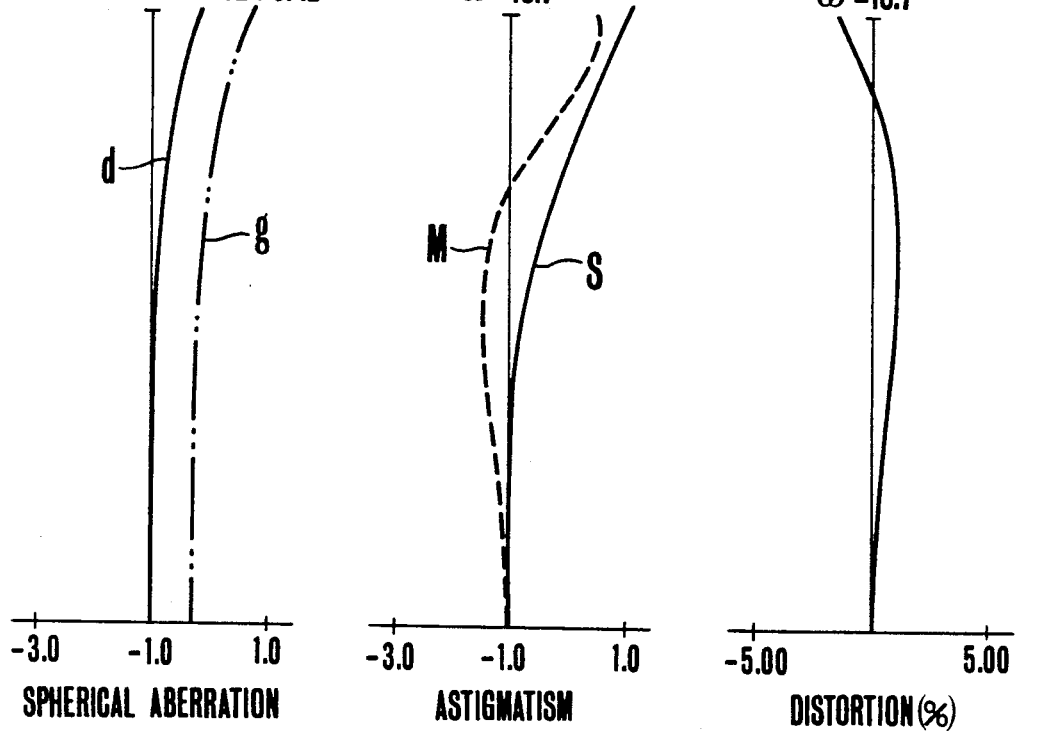
Figure 11C:
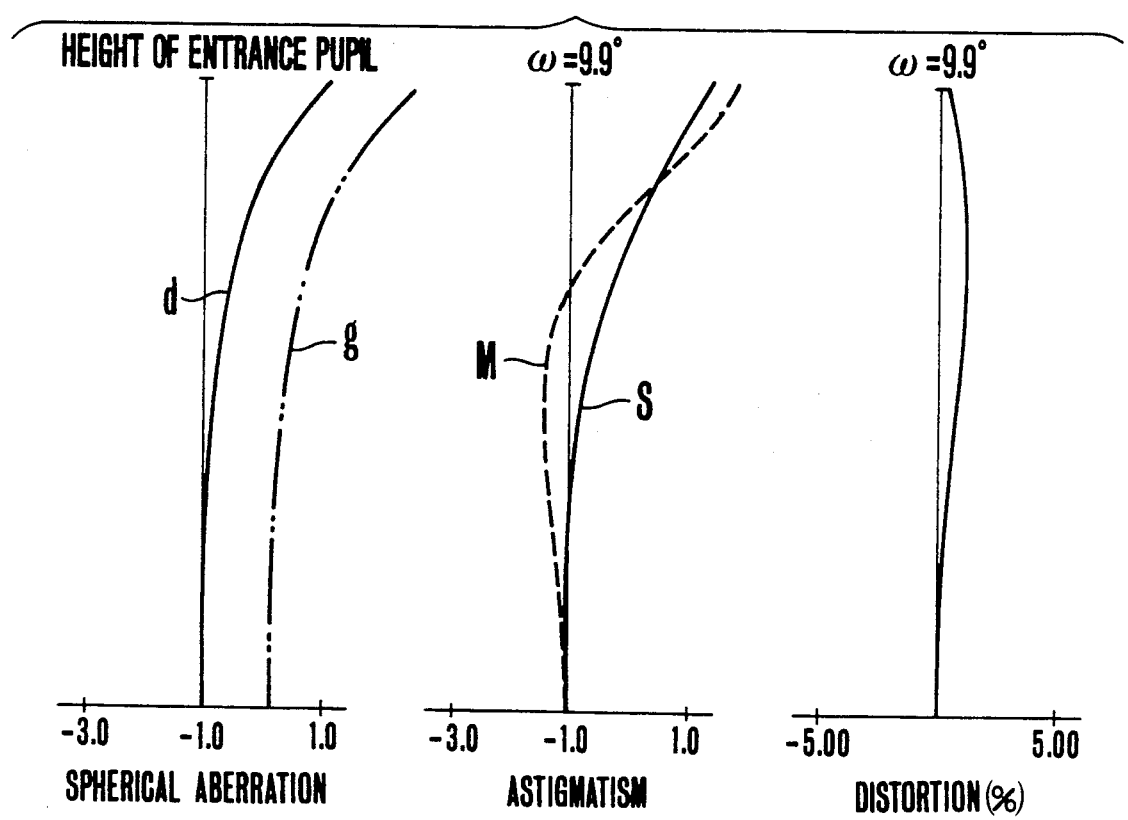
Figure 12A:
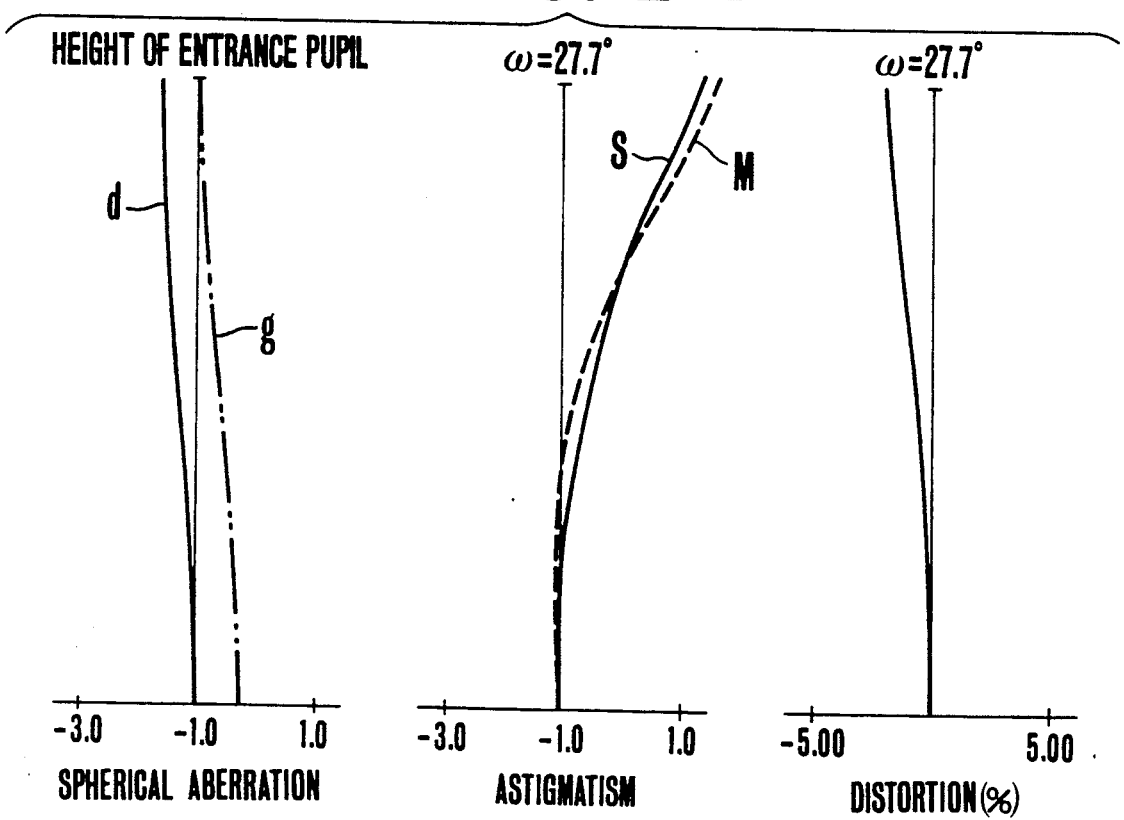
Figure 12B:
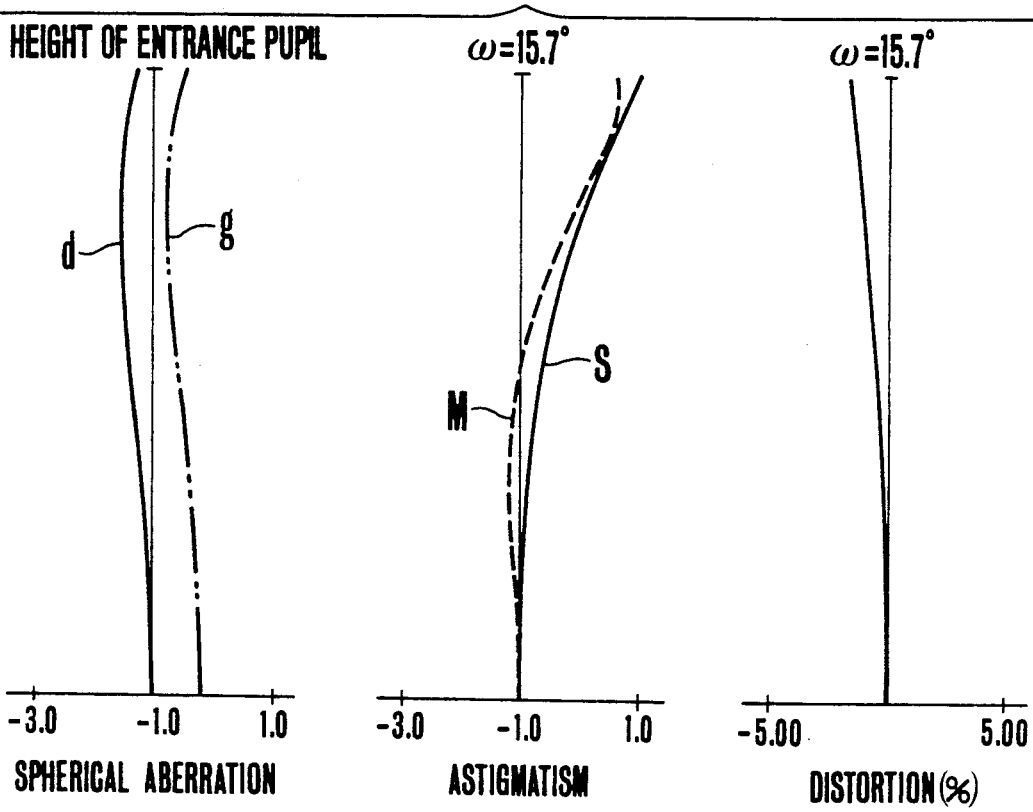
Figure 12C:
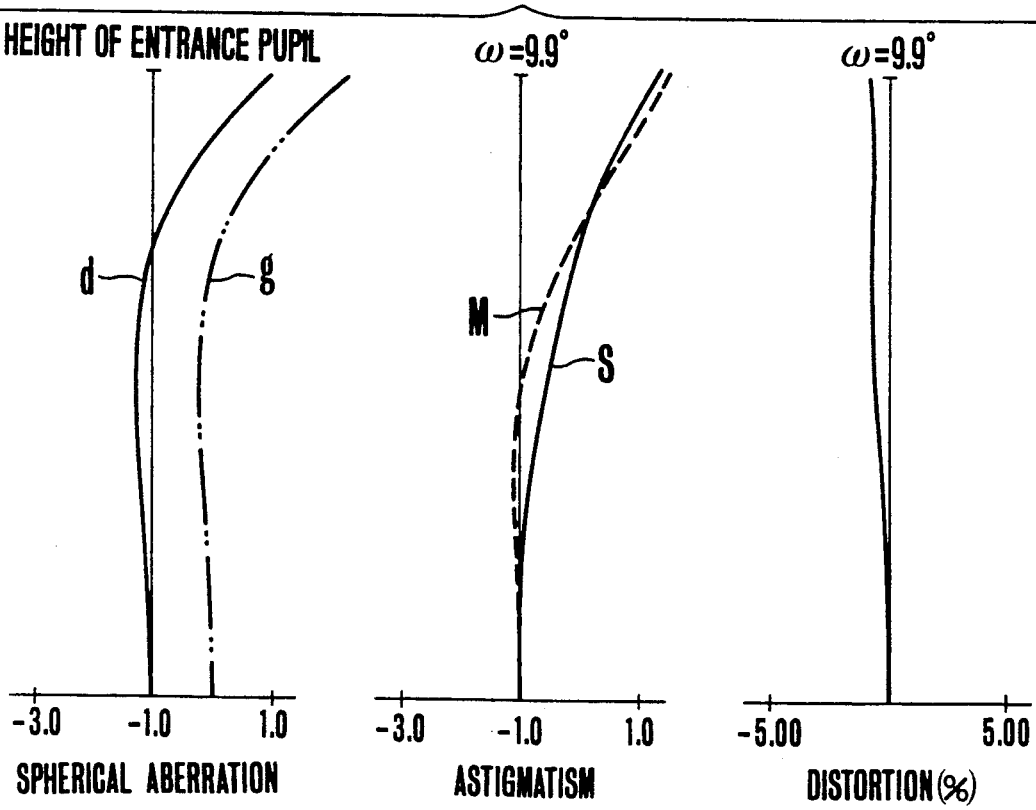
Figure 13A:
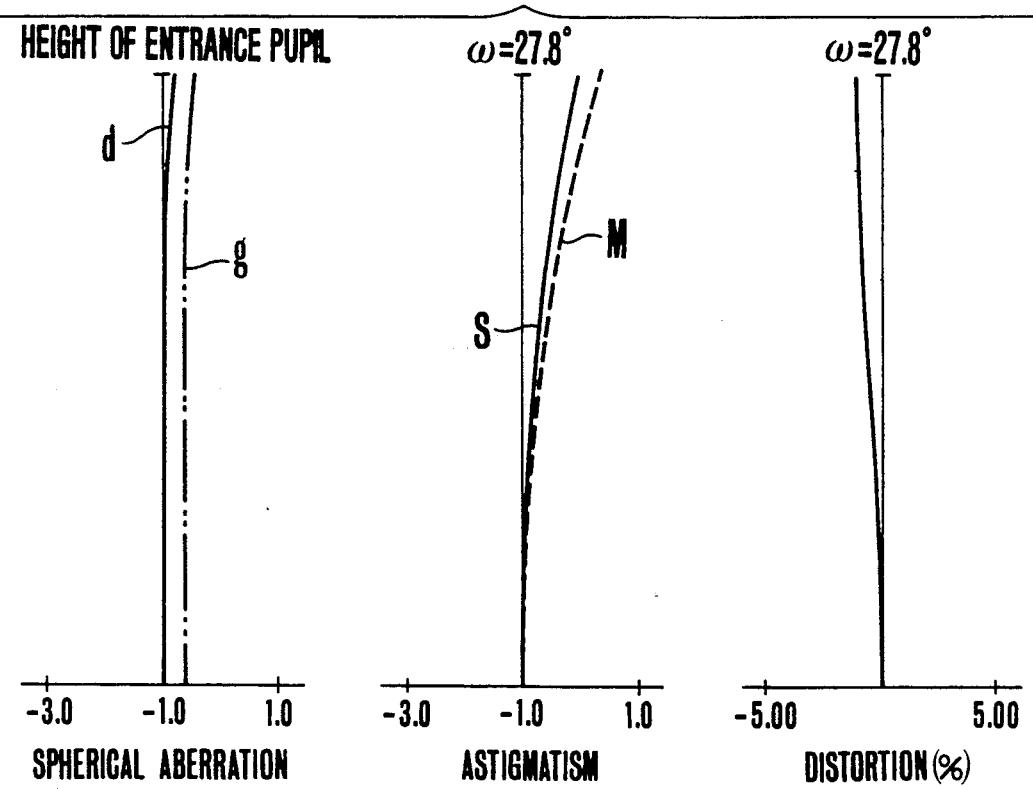
Figure 13B:
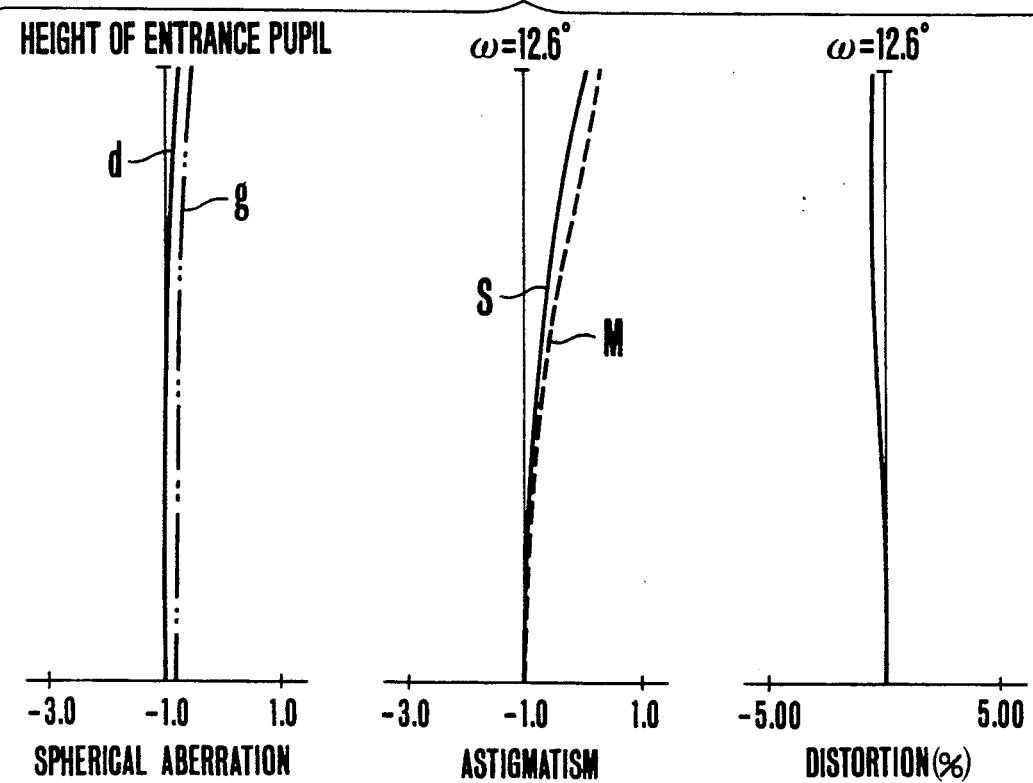
Figure 13C:
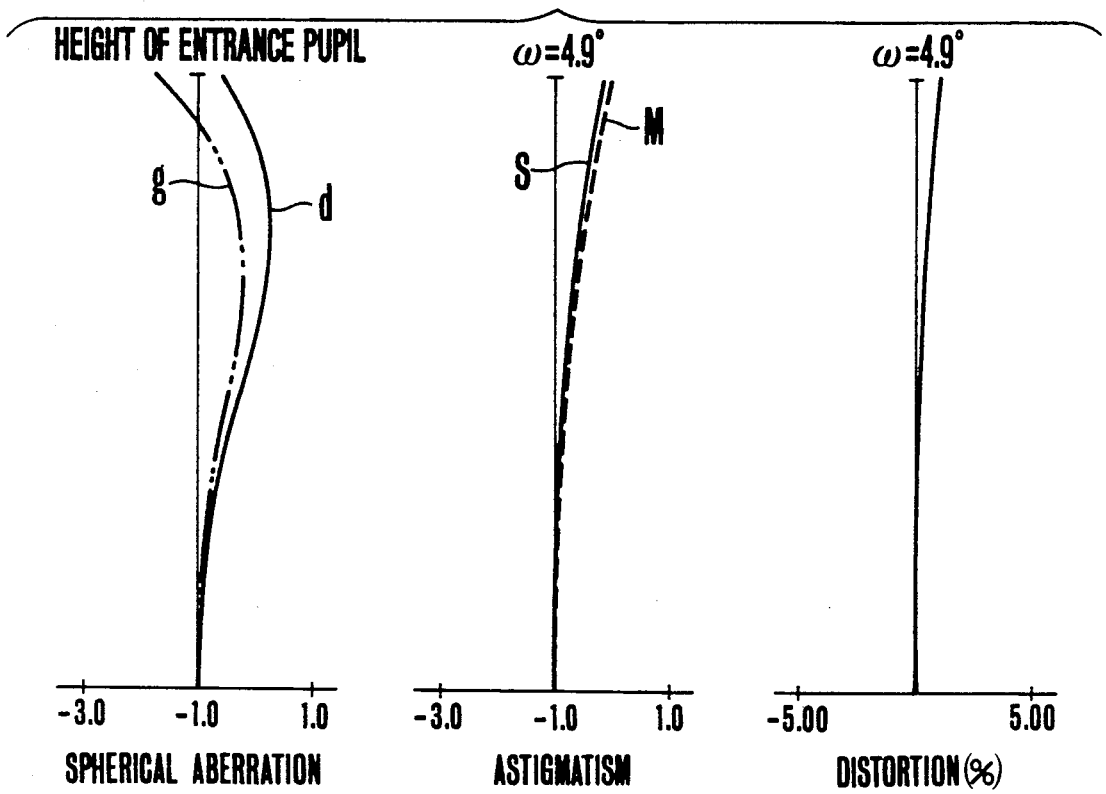
Figure 14A:
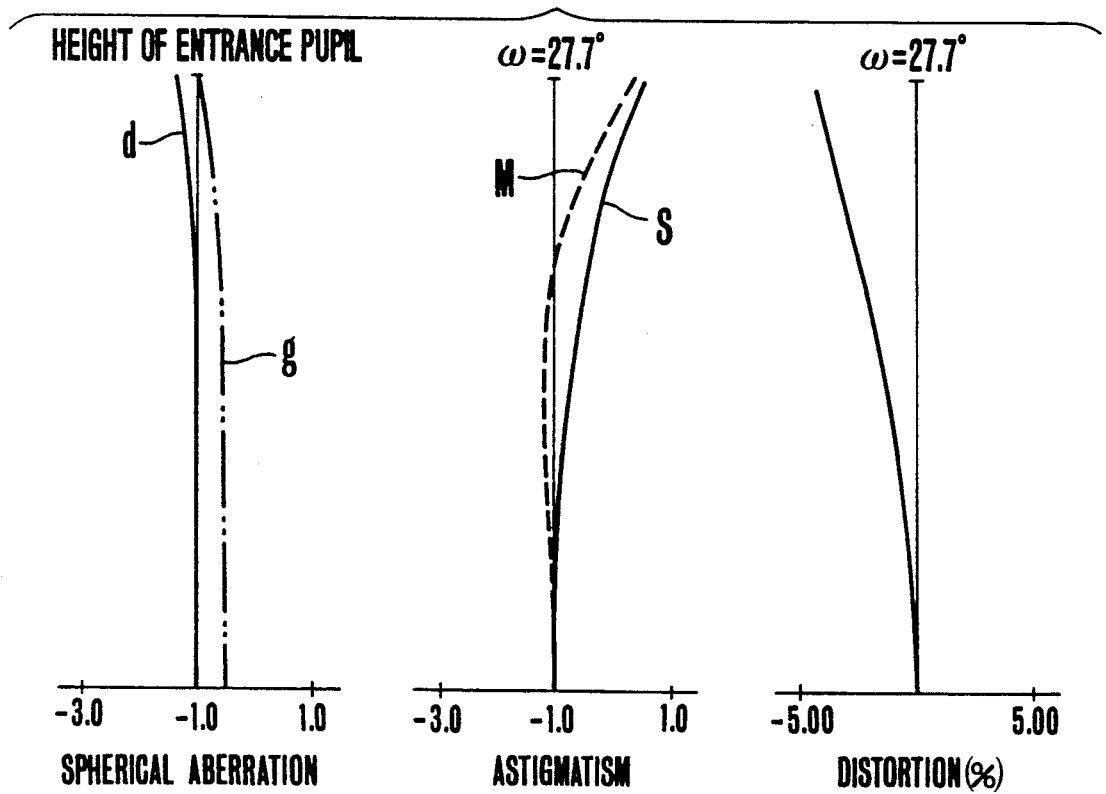
Figure 14B:
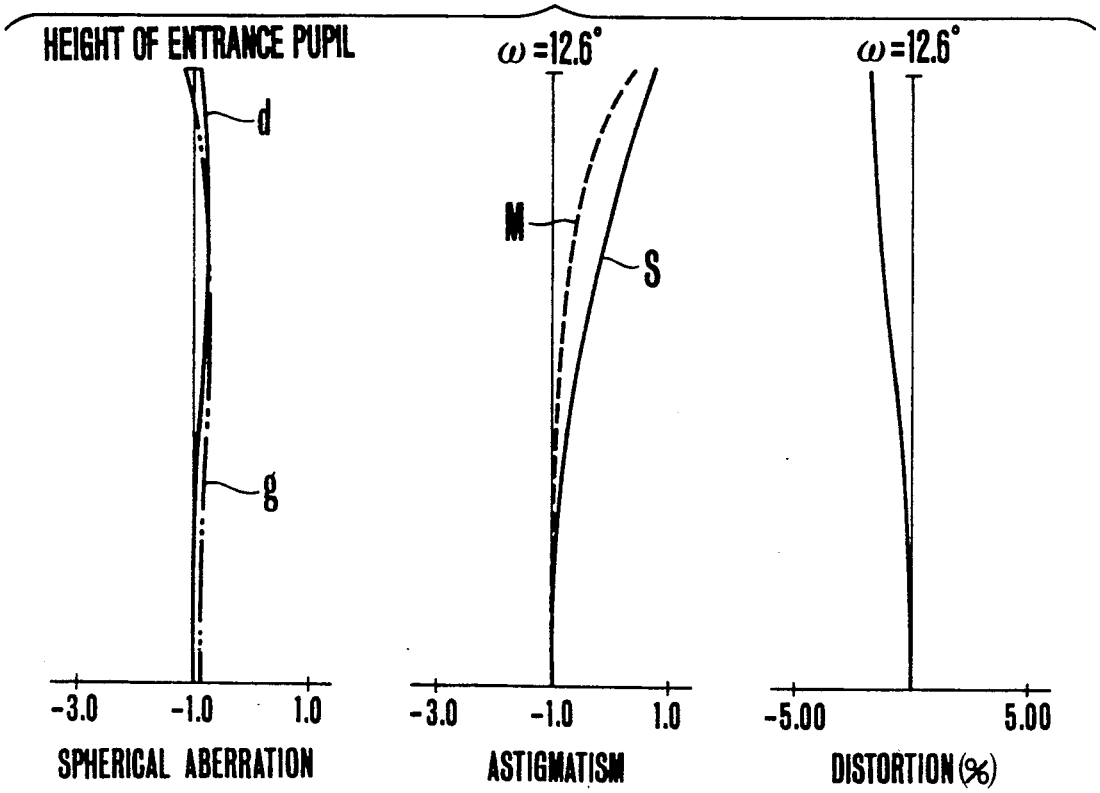
Figure 14C:
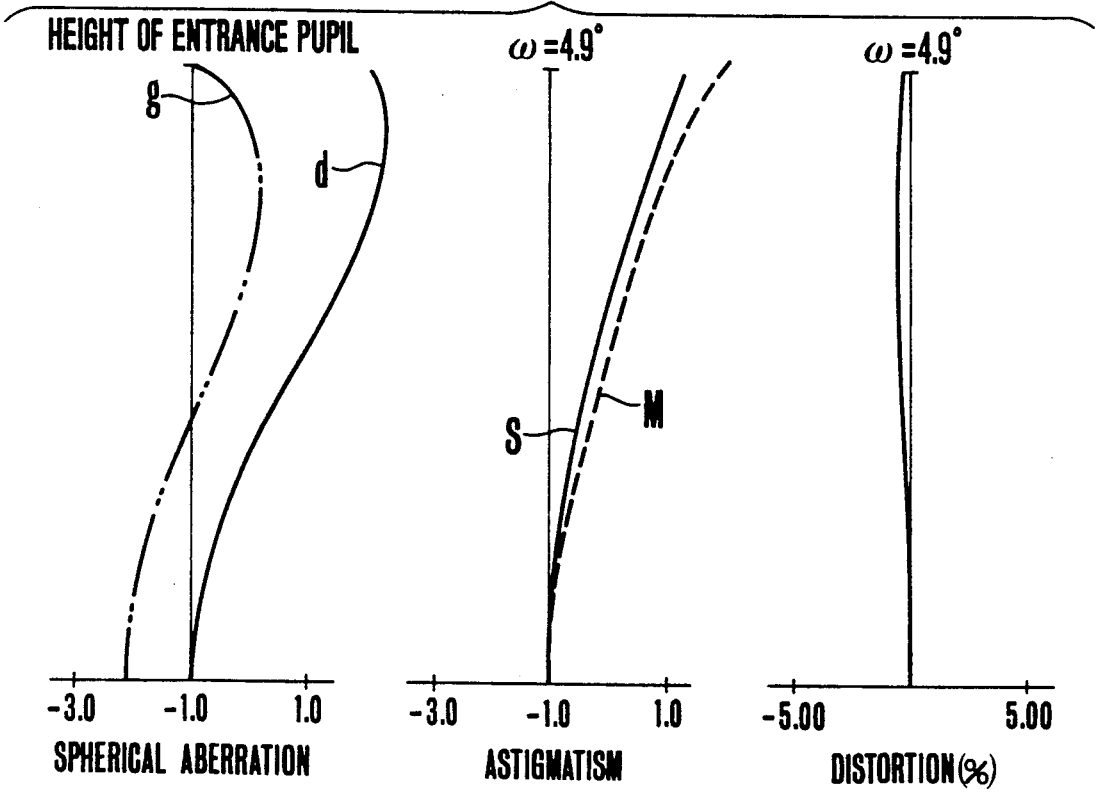

In FIG. 7 and FIG. 8, the erector lens group 2 has three lenses, i.e., a positive lens, a negative lens and a positive lens in this order from the object side. Also, in FIG. 9 and FIG. 10, the erector lens group 2 has four lenses, i.e., a positive lens, a positive lens, a negative lens and a positive lens in this order from the object side.

Next, the technical significance of the above-described conditions are explained. The inequalities (5) and (6) concern with the lateral magnifications of the erector lens group 2 in the wide-angle end and the telephoto end.

When the lower limit of the inequalities of condition (5) is exceeded, because the magnification of the erector lens group 2 is too low, the finder magnification in the wide-angle end comes to be small. So, it is no good.

When the upper limit of the inequalities of condition (5), or the lower limit of the inequalities of condition (6), is exceeded, under the predetermined ratio of change of the magnification, the range of variation of the total length of the lens with variation of the magnification becomes larger than the total movement of the objective lens group. So, it is no good.

When the upper limit of the inequalities of condition (6) is exceeded, the lens diameter of the erector lens group 2 is unduly largely increased, and it becomes extremely difficult to correct spherical aberration in the telephoto end. So, it is no good.

The objects of the invention can be accomplished on the basis of the features described above. Yet, to achieve a further improvement of the optical performance, it is preferred to satisfy the following condition:

$$0.1 < fo/fe < 3.0 \tag{7}$$

where fo and fe are the focal lengths of the objective lens group 1 and the eyepiece lens group 3 respectively.

The inequalities of condition (7) concern with the ratio of the focal lengths of the objective lens group 1 and the eyepiece lens group 3 and are to obtain a good finder image.

When the upper limit of the inequalities of condition (7) is exceeded, the finder observation magnification of the entire system becomes too high to correct the diopter deviation in the marginal portions of the field of view with ease. Meanwhile, when the lower limit is exceeded, the observation magnification is too small and, therefore, the finder image is small and uncomfortable to observe.

Next, numerical examples 3 to 6 of the invention are shown. In the numerical examples 3 to 6, Ri represents the radius of curvature of the i-th lens surface counting from the object side, Di the i-th lens thickness or air separation counting from the object side, and Ni and $\nu i$ the refractive index and Abbe number of the glass of the i-th lens counting from the object side respectively.

The shape of an aspheric surface in coordinates with X axis in the optical axis and H axis in the perpendicular direction to the optical axis, the direction in which light advances being taken as positive, is expressed by the following equation:

$$X = \frac{(1/R)H^2}{1 + \sqrt{1 - (H/R)^2}} + AH^2 + BH^4 + CH^6 + DH^8 + EH^{10}$$

where R is the radius of paraxial curvature, and A, B, C, D and E are the aspherical coefficients.

Incidentally, the notation of "D-0x" means "$10^{-x}$". Also, the relationship of each of the above-described conditions (5) to (7) and the various aberration values in the numerical examples 3 to 6 is shown in Table-1.

| Numerical Example 3 (FIGS. 7, 11(A), 11(B) and 11(C)): $2\omega = 55.4° - 19.9°$ | | |
| --- | --- | --- |
| R1 = 11.82 | D1 = 6.0 | N1 = 1.49171  $\nu$1 = 57.4 |
| *R2 = −6.82 | D2 = 13.0 | |
| R3 = 11.04 | D3 = 4.0 | N2 = 1.49171  $\nu$2 = 57.4 |

-continued

| | | |
|---|---|---|
| R4 = 99.60 | D4 = Variable | |
| *R5 = 11.60 | D5 = 3.5 | N3 = 1.49171 ν3 = 57.4 |
| R6 = −7.03 | D6 = 1.94 | |
| R7 = −44.84 | D7 = 1.6 | N4 = 1.80518 ν4 = 25.4 |
| R8 = 7.89 | D8 = 2.64 | |
| R9 = 16.02 | D9 = 3.5 | N5 = 1.49171 ν5 = 57.4 |
| R10 = −10.39 | D10 = Variable | |
| R11 = 30.00 | D11 = 3.0 | N6 = 1.49171 ν6 = 57.4 |
| R12 = ∞ | D12 = 20.0 | |
| *R13 = 17.00 | D13 = 3.5 | N7 = 1.49171 ν7 = 57.4 |
| R14 = −21.51 | D14 = 16.0 | |
| R15 = Eyepoint | | |

| Aspherical Coefficient | Aspheric Surface | | |
|---|---|---|---|
| | R2 | R5 | R13 |
| Paraxial R | −6.825D + 00 | 1.160D + 01 | 1.700D + 01 |
| A | 0.0 | 0.0 | 0.0 |
| B | 1.076D − 03 | −9.575D − 04 | −1.015D − 04 |
| C | −1.784D − 05 | −9.161D − 07 | 6.566D − 06 |
| D | 4.593D − 07 | 5.340D − 07 | −5.210D − 07 |
| E | 0.0 | −2.065D − 08 | 1.143D − 08 |

| Variable Separation | Paraxial Magnification (2ω) | | |
|---|---|---|---|
| | 0.37(55.4°) | 0.65(31.4°) | 1.04(19.9°) |
| D4 | 25.71 | 15.36 | 9.76 |
| D10 | 11.53 | 17.93 | 27.53 |

*Aspheric Surface

Numerical Example 4 (FIGS. 8, 12(A), 12(B) and 12(C)):
2ω = 55.4° − 19.9°

| | | |
|---|---|---|
| R1 = 15.20 | D1 = 6.0 | N1 = 1.49171 ν1 = 57.4 |
| *R2 = −6.82 | D2 = 13.0 | |
| R3 = 12.32 | D3 = 4.0 | N2 = 1.49171 ν2 = 57.4 |
| R4 = 99.60 | D4 = Variable | |
| *R5 = 7.21 | D5 = 5.0 | N3 = 1.49171 ν3 = 57.4 |
| R6 = −14.96 | D6 = 2.47 | |
| R7 = −102.15 | D7 = 2.0 | N4 = 1.80518 ν4 = 25.4 |
| R8 = 6.29 | D8 = 3.36 | |
| R9 = 17.49 | D9 = 4.0 | N5 = 1.49171 ν5 = 57.4 |
| R10 = −10.36 | D10 = Variable | |
| R11 = 30.00 | D11 = 3.0 | N6 = 1.49171 ν6 = 57.4 |
| R12 = ∞ | D12 = 20.0 | |
| *R13 = 15.00 | D13 = 3.5 | N7 = 1.49171 ν7 = 57.4 |
| R14 = −26.39 | D14 = 16.0 | |
| R15 = Eyepoint | | |

| Aspherical Coefficient | Aspheric Surface | | |
|---|---|---|---|
| | R2 | R5 | R13 |
| Paraxial R | −6.820D + 00 | 7.218D + 00 | 1.500D + 01 |
| A | 0.0 | 0.0 | 0.0 |
| B | 5.945D − 04 | −5.210D − 04 | −1.688D − 04 |
| C | −6.726D − 07 | −1.197D − 06 | 1.031D − 05 |
| D | 2.489D − 07 | −6.2060 − 08 | −5.251D − 07 |
| E | 0.0 | −3.372D − 09 | 9.732D − 09 |

| Variable Separation | Paraxial Magnification (2ω) | | |
|---|---|---|---|
| | 0.37(55.4°) | 0.67(31.4°) | 1.04(19.9°) |
| D4 | 37.23 | 24.00 | 16.86 |
| D10 | 12.09 | 20.24 | 32.46 |

*Aspheric Surface

Numerical Example 5 (FIGS. 9, 13(A), 13(B) and 13(C)):
2ω = 55.6° − 4.9°

| | | |
|---|---|---|
| R1 = −20.02 | D1 = 4.0 | N1 = 1.69680 ν1 = 55.5 |
| R2 = −10.16 | D2 = 0.3 | |
| R3 = 21.02 | D3 = 4.0 | N2 = 1.48749 ν2 = 70.2 |
| R4 = −17.92 | D4 = 12.21 | |
| R5 = 12.93 | D5 = 4.0 | N3 = 1.50137 ν3 = 56.4 |
| R6 = 98.42 | D6 = Variable | |
| R7 = 20.64 | D7 = 3.0 | N4 = 1.51633 ν4 = 64.1 |
| R8 = −26.74 | D8 = 0.2 | |
| R9 = 9.64 | D9 = 3.0 | N5 = 1.51633 ν5 = 64.1 |
| R10 = −267.23 | D10 = 2.28 | |
| R11 = −14.49 | D11 = 2.0 | N6 = 1.80518 ν6 = 25.4 |
| R12 = 9.64 | D12 = 2.48 | |
| R13 = 67.21 | D13 = 3.0 | N7 = 1.71299 ν7 = 53.8 |
| R14 = −11.21 | D14 = Variable | |
| R15 = 18.00 | D15 = 3.0 | N8 = 1.50137 ν8 = 56.4 |
| R16 = | D16 = Variable | |
| R17 = 34.96 | D17 = 3.0 | N9 = 1.71299 ν9 = 53.8 |
| R18 = −35.06 | D18 = 16.0 | |
| R19 = Eyepoint | | |

| Variable Separation | Paraxial Magnification (2ω) | | |
|---|---|---|---|
| | 0.2(55.6°) | 0.46(25.3°) | 1.19(4.9°) |
| D4 | 51.29 | 27.70 | 16.18 |
| D14 | 12.88 | 23.54 | 53.88 |
| D16 | 23.50 | 23.50 | 23.50 |

Numerical Example 6 (FIGS. 10, 14(A), 14(B) and 14(C)):
2ω = 55.6° − 4.9°

| | | |
|---|---|---|
| R1 = −20.08 | D1 = 4.0 | N1 = 1.69680 ν1 = 55.5 |
| R2 = −10.16 | D2 = 0.3 | |
| R3 = 21.02 | D3 = 4.0 | N2 = 1.48749 ν2 = 70.2 |
| R4 = −17.92 | D4 = 12.2 | |
| R5 = 12.98 | D5 = 4.0 | N3 = 1.50137 ν3 = 56.4 |
| R6 = 98.42 | D6 = Variable | |
| R7 = 20.64 | D7 = 3.0 | N4 = 1.51633 ν4 = 64.1 |
| R8 = −26.74 | D8 = 0.2 | |
| R9 = 9.64 | D9 = 3.0 | N5 = 1.51633 ν5 = 64.1 |
| R10 = −267.23 | D10 = 2.28 | |
| R11 = −14.49 | D11 = 2.0 | N6 = 1.80518 ν6 = 25.4 |
| R12 = 9.64 | D12 = 2.48 | |
| R13 = 67.21 | D13 = 3.0 | N7 = 1.71299 ν7 = 53.8 |
| R14 = −11.21 | D14 = Variable | |
| R15 = 15.00 | D15 = 3.0 | N8 = 1.49171 ν8 = 57.4 |
| R16 = −13.55 | D16 = 16.0 | |
| R17 = Eyepoint | | |

| Variable Separation | Paraxial Magnification (2ω) | | |
|---|---|---|---|
| | 0.36(55.6°) | 0.80(25.3°) | 2.07(4.9°) |
| D4 | 51.29 | 27.70 | 16.18 |
| D14 | 28.77 | 39.43 | 69.77 |

TABLE-1

| Condition | Factor | Numerical Example | | | |
|---|---|---|---|---|---|
| | | 3 | 4 | 5 | 6 |
| (5) | $-\beta_W$ | 0.60 | 0.6 | 0.45 | 0.45 |
| (6) | $-\beta_T$ | 1.67 | 1.67 | 2.61 | 2.61 |
| (7) | fo/fe | 0.57 | 0.57 | 0.80 | 0.80 |

An embodiment in which the number of lenses in the erector lens group 2 that is a lens group for forming a secondary image is made as small as possible, while still permitting a high ratio of change of the magnification and good stability of optical performance to be achieved, is described with reference to the lens block diagrams shown in FIGS. 15 and 16.

In this embodiment, the number of lenses constituting the erector lens group 2 is limited to three. And when the erector lens group 2 is constructed with, in the direction from the object side, a first lens 2a having a positive refractive power, a second lens 2b having a negative refractive power and a third lens 2c having a positive refractive power, totaling three lenses, the radii of curvature Rn1 and Rn2 of the object side and eyepoint side of the second lens 2b respectively are made to satisfy the following condition:

$$(Rn2+Rn1)/(Rn2-Rn1) < -0.35 \tag{8}$$

so that the various aberrations the erector lens group 2 produces are corrected well.

It should be pointed out that in a numerical example 7 to be described later of the present embodiment, the objective lens group 1 is constructed with one aspheric lens made from plastic material in order to reduce the number of lenses.

It should also be pointed out that even the first lens 2a of the erector lens group 2 and the eyepiece lens 3a each are constructed with an aspheric lens of plastic material so that while preserving good aberrations, the number of lenses is reduced to achieve simplification of the lens system whole and reduction of the cost.

Incidentally, in numerical examples 7 and 8 to be described later, all the constituent lenses of the erector lens group 2 except the negative second lens 2b are made from plastic material Next, the technical significance of the above-described condition (8) is explained.

The inequality of condition (8) concerns with the lens configuration of the second lens 2b of negative refractive power. When the upper limit is exceeded, the amount of field curvature produced from the erector lens group 2 increases, and the field diopter in the marginal portions of the viewfield of the finder increases to the positive direction relative to the center of field. So, it is no good.

The real image type variable magnification finder optical system the present invention aims at is achieved by satisfying the various conditions described above. Yet, to well correct chromatic aberrations in the entire area of the picture frame, it is preferred that the Abbe number $\nu n$ of the material of the second lens 2b having the negative refractive power constituting part of the aforesaid erector lens group 2 satisfies the following condition:

$$23 < \nu n < 40 \qquad (9)$$

When the upper limit of the inequalities of condition (9) is exceeded, large on-axial chromatic aberration produced on the telephoto side becomes difficult to correct well.

When the lower limit of the inequalities of condition (9) is exceeded, because the material of the second lens 2b is chosen among softer glasses, it gets harder to obtain a lens surface of high precision on the lens production. So it is no good.

In the following, the numerical examples 7 and 8 of the invention are shown. In the numerical examples 7 and 8, Ri represents the radius of curvature of the i-th lens surface counting from the object side, Di the i-th lens thickness or air separation counting from the object side and Ni and $\nu i$ the refractive index and Abbe number of the glass of the i-th lens counting from the object side.

The shape of an aspheric surface in coordinates with X axis in the optical axis and H axis in the direction perpendicular to the optical axis, the direction in which light advances being taken as positive, is defined by the following equation $$X = \frac{(1/R)H^2}{1 + \sqrt{1 - (H/R)^2}} + AH^2 + BH^4 + CH^6 + DH^8 + EH^{10}$$

where R is the radius of curvature of the paraxial region, and A, B, C, D and E are the aspherical coefficients. The term "D-X" means "$10^{-X}$".

Also, the relationship of each of the above-described conditions with the various values in the numerical examples is shown in Table-2.

Figure 15:
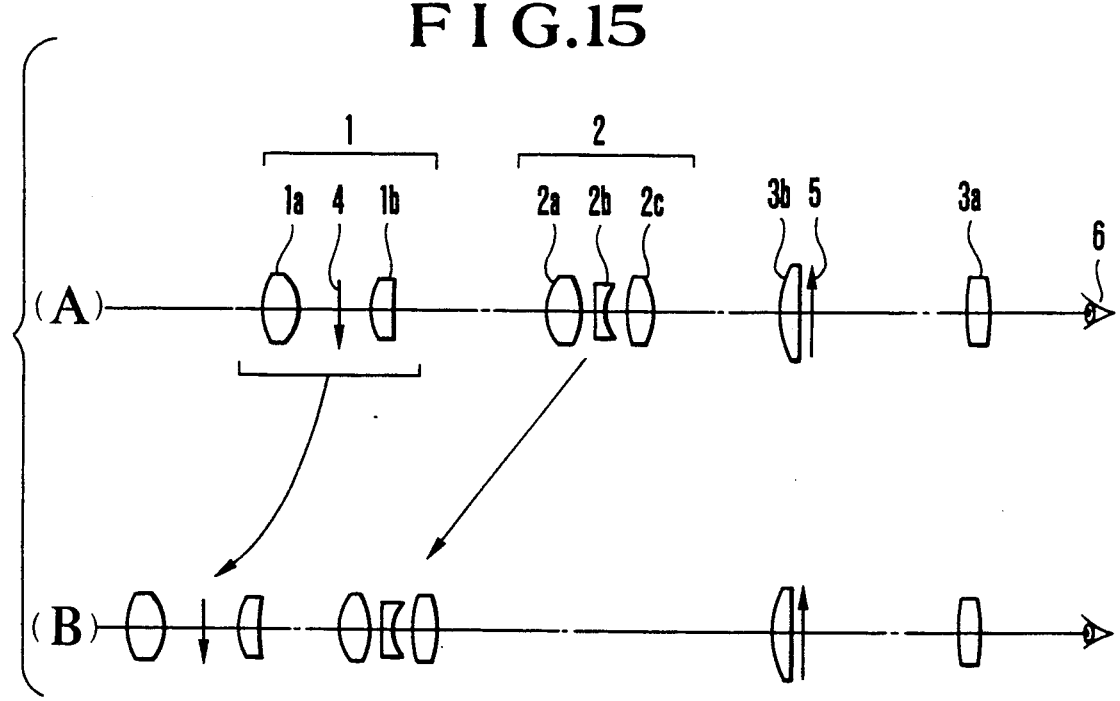
FIGS. 15 and 16 are lens block diagrams illustrating a further embodiment of the invention.
Figure 17A:
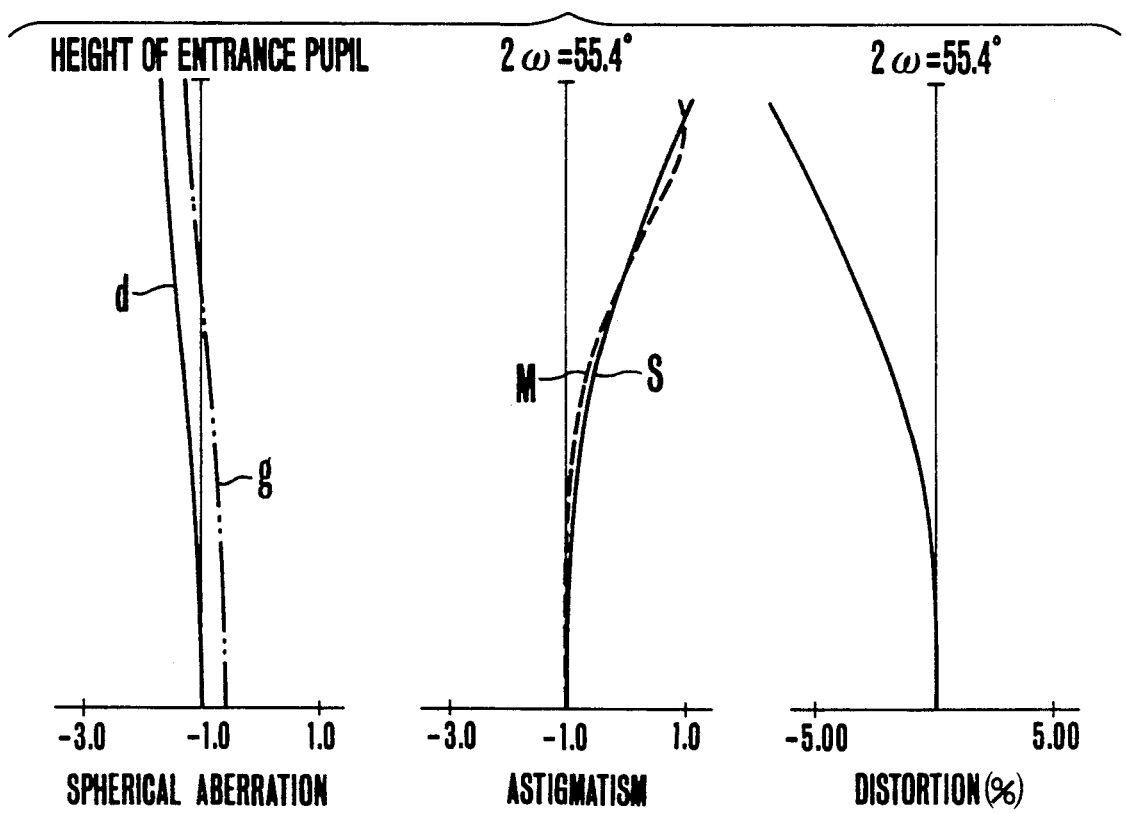
FIGS. 17(A), 17(B), 18(A) and 18(B) are graphs of the various aberrations of the embodiment shown in FIGS. 15 and 16, FIGS. 17(A) and 18(A) showing the aberration curves at the wide-angle end and FIGS. 17(B) and 18(B) showing the aberration curves at the telephoto end.
Figure 17B:
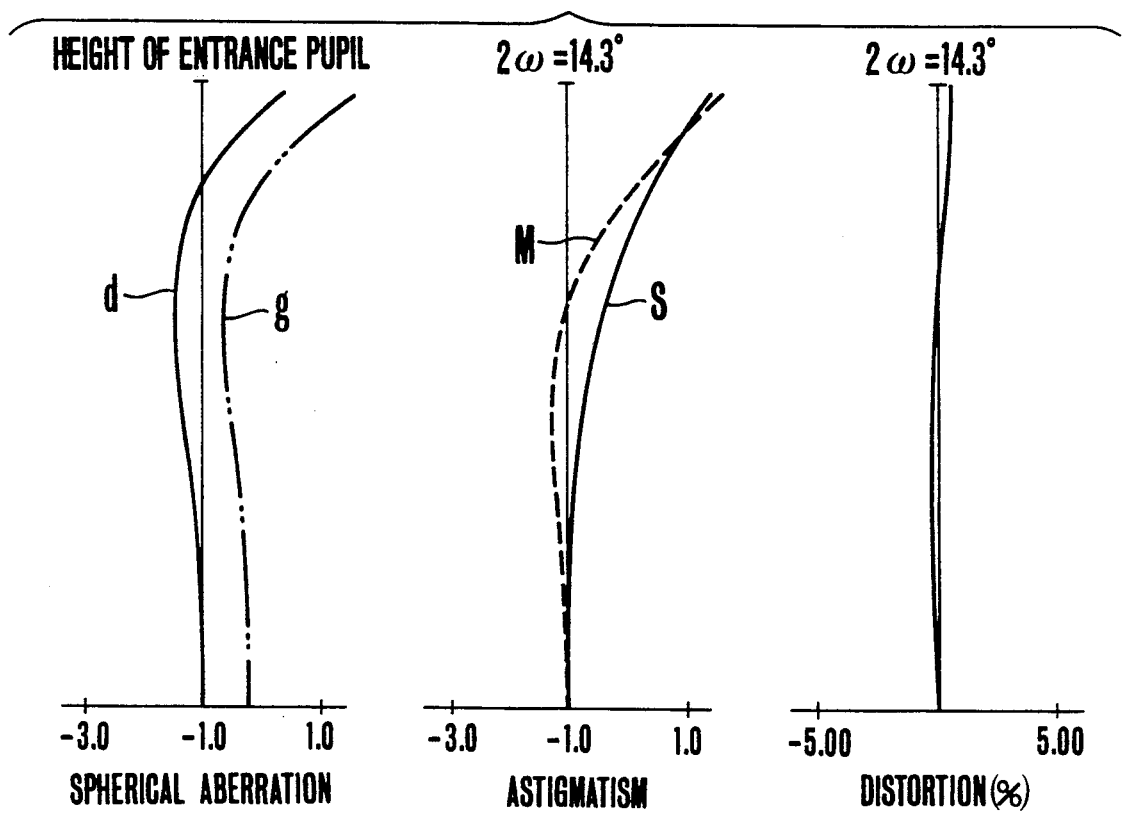

Numerical Example 7 (FIGS. 15, 17(A), and 17(B)):

F = −389   Diameter of Pupil  $\phi = 3.5$   $2\omega = 55.4 - 14.3°$

| | | |
|---|---|---|
| R1 = 12.63 | D1 = 6.0 | N1 = 1.49171  $\nu 1 = 57.4$ |
| *R2 = −6.50 | D2 = 13.0 | |
| R3 = 10.58 | D3 = 4.0 | N2 = 1.49171  $\nu 2 = 57.4$ |
| R4 = 99.60 | D4 = Variable | |
| *R5 = 7.27 | D5 = 5.0 | N3 = 1.49171  $\nu 3 = 57.4$ |
| R6 = −13.28 | D6 = 2.47 | |
| R7 = −105.28 | D7 = 2.0 | N4 = 1.80518  $\nu 4 = 25.4$ |
| R8 = 6.46 | D8 = 3.36 | |
| R9 = 19.62 | D9 = 4.0 | N5 = 1.49171  $\nu 5 = 57.4$ |
| R10 = −13.54 | D10 = Variable | |
| R11 = 18.93 | D11 = 3.0 | N6 = 1.49171  $\nu 6 = 57.4$ |
| R12 = ∞ | D12 = 28.8 | |
| *R13 = 30.00 | D13 = 3.5 | N7 = 1.49171  $\nu 7 = 57.4$ |
| R14 = −32.15 | D14 = 16.0 | |
| R15 = ∞ | | |

| Aspherical Coefficient | Aspheric Surface | | |
|---|---|---|---|
| | R2 | R5 | R13 |
| Paraxial R | −6.5D + 00 | 7.27D + 00 | 3.0D + 01 |
| A | 0.0D + 00 | 0.0D + 00 | 0.0D + 00 |
| B | 6.759D − 04 | −5.329D − 04 | −1.451D − 04 |
| C | −6.681D − 06 | −2.221D − 06 | 1.163D − 05 |
| D | 4.457D − 07 | 3.156D − 08 | −5.892D − 07 |
| E | 0.000D − 00 | −3.267D − 09 | 1.013D − 08 |

| Variable Separation | Focal Length | |
|---|---|---|
| | W | T |
| D4 | 26.39 | 14.32 |
| D10 | 21.93 | 56.25 |

*Aspheric Surface

Figure 16:
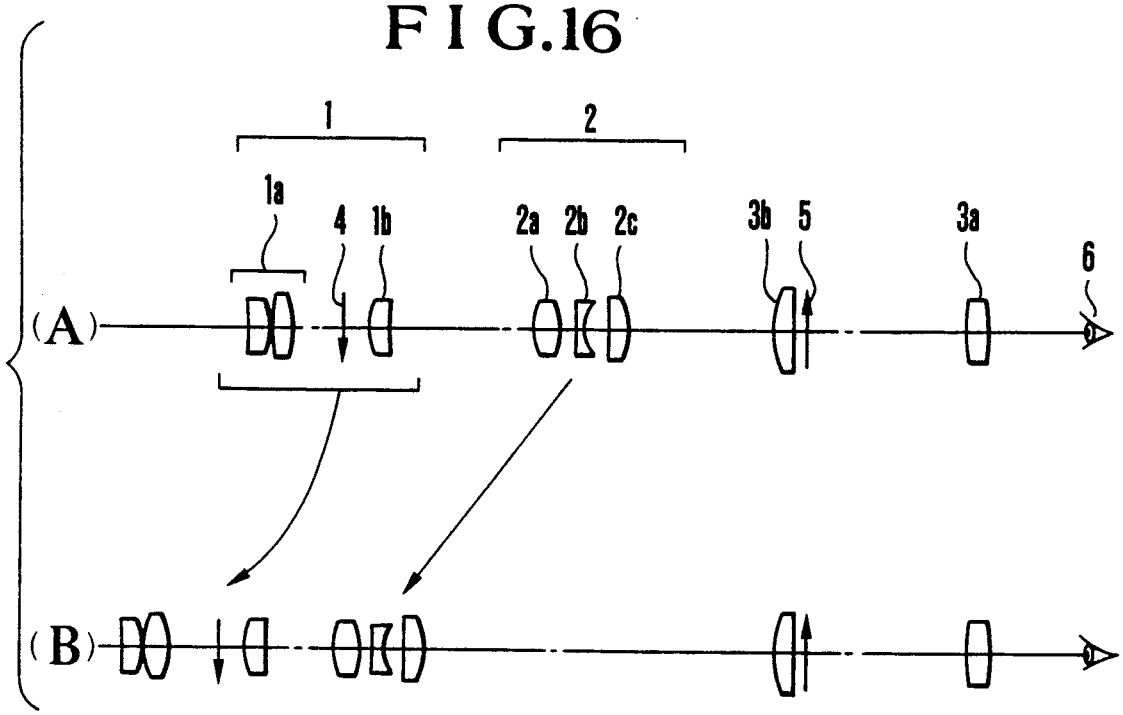
Figure 18A:
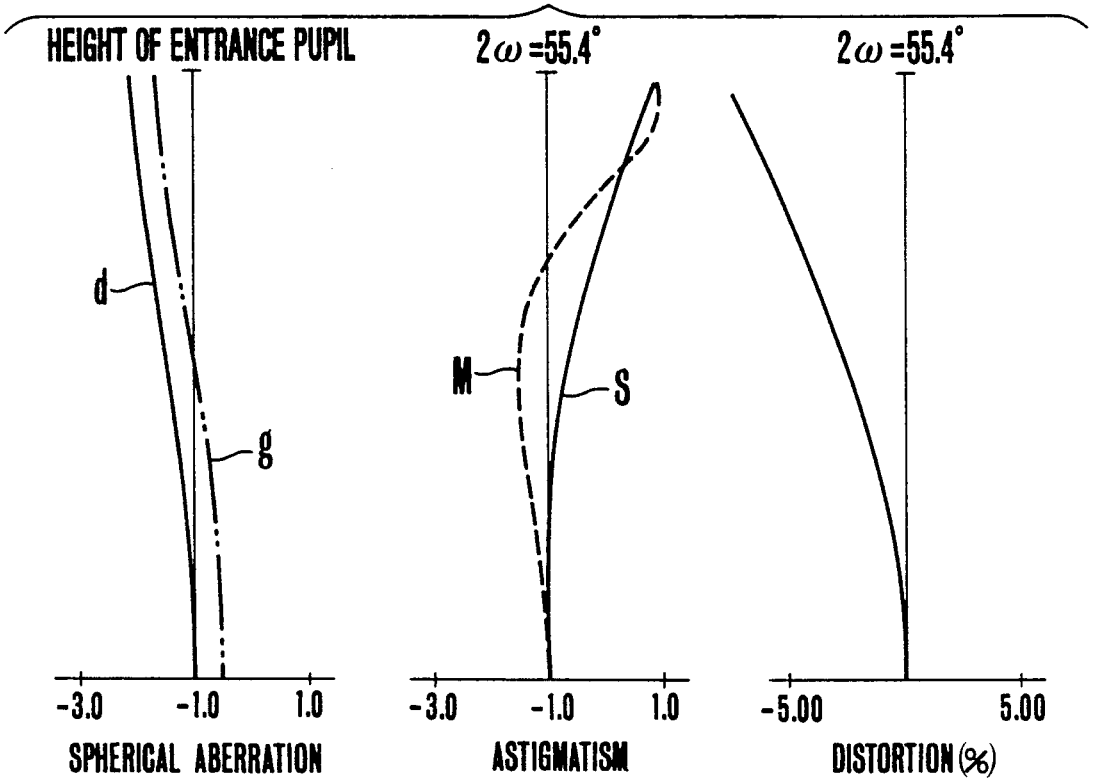
Figure 18B:
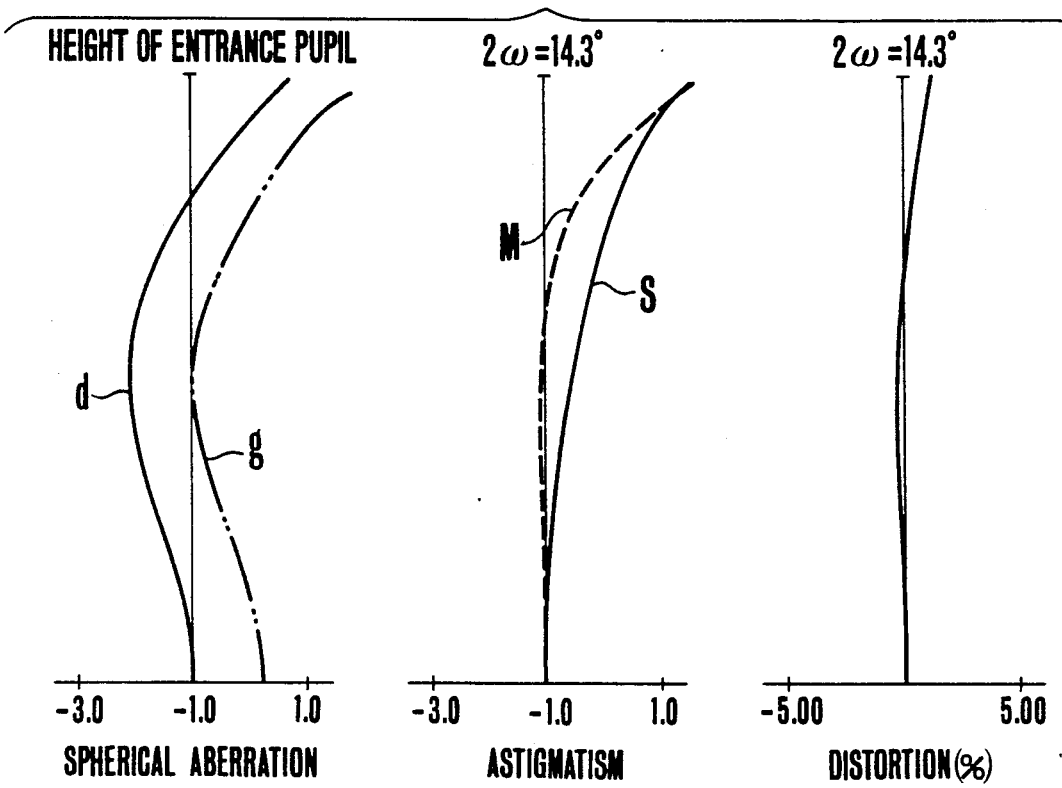

Numerical Example 8 (FIGS. 16, 18(A), and 18(B)):

F = −388   Diameter of Pupil  $\phi = 3.5$   $2\omega = 55.4° - 14.3°$

| | | |
|---|---|---|
| R1 = −100.00 | D1 = 3.5 | N1 = 1.50137  $\nu 1 = 56.4$ |
| R2 = −10.55 | D2 = 0.5 | |
| R3 = 16.53 | D3 = 4.0 | N2 = 1.50137  $\nu 2 = 56.4$ |
| R4 = −11.23 | D4 = 13.0 | |
| R5 = 10.55 | D5 = 3.5 | N3 = 1.50137  $\nu 3 = 56.4$ |
| R6 = 100.00 | D6 = Variable | |
| *R7 = 8.85 | D7 = 4.5 | N4 = 1.49171  $\nu 4 = 57.4$ |
| R8 = −10.95 | D8 = 2.5 | |
| R9 = −56.59 | D9 = 2.0 | N5 = 1.80518  $\nu 5 = 25.4$ |
| R10 = 8.80 | D10 = 3.3 | |
| R11 = 3279.75 | D11 = 3.5 | N6 = 1.49171  $\nu 6 = 57.4$ |
| R12 = −9.99 | D12 = Variable | |
| R13 = 18.34 | D13 = 3.0 | N7 = 1.49171  $\nu 7 = 57.4$ |
| R14 = ∞ | D14 = 28.8 | |
| *R15 = 30.07 | D15 = 3.5 | N8 = 1.49171  $\nu 8 = 57.4$ |
| R16 = −32.15 | D16 = 16.0 | |
| R17 = ∞ | | |

| Aspherical Coefficient | Aspheric Surface | |
|---|---|---|
| | R7 | R15 |
| Paraxial R | 8.85D + 00 | 3.00D + 01 |
| A | 0.0D + 00 | 0.0D + 00 |
| B | −7.190D − 04 | −1.049D − 04 |
| C | 2.723D − 05 | 4.284D − 06 |
| D | −2.018D − 06 | −3.069D − 08 |
| E | 5.503D + 08 | −2.786D − 09 |

| Variable Separation | Focal Length | |
|---|---|---|
| | W | T |
| D6 | 24.20 | 12.14 |
| D12 | 24.06 | 58.38 |

*Aspheric Surface

TABLE 2

| Condition | Factor | Numerical Example 7 | Numerical Example 8 |
|---|---|---|---|
| (8) | $\dfrac{Rn_2 + Rn_1}{Rn_2 - Rn_1}$ | −0.89 | −0.73 |
| (9) | $\nu n$ | 25.4 | 25.4 |

Now, it follows that with the camera having installed therein the above-described finder optical system, which camera uses, for example, film for 35 mm format, it is desirable on making photographs that when the exposure area on the photosensitive surface is altered, for example, from the full size to the half size, the size of frame of the field of view of the finder also is automatically altered (reduced).

However, it is considered that the mere alteration of the finder viewfield frame along with the alteration of the picture area makes it difficult to observe as the field of view looked through the finder system narrows.

Also, mere use of a converter lens for altering the size of the field of view looked through the finder system leads to change the diopter. To avoid this, the eyepiece lens must be moved. For this purpose, the operating mechanism becomes complicated, and the quality of the finder image tends to lower largely.

Besides these, in the camera having the photographic system and the finder system arranged in separation from each other, it is desirable on making photographs that when the photographic system is of the zoom type, the field magnification of the finder varies with variation of the image magnification, or a variable magnification finder is used. Since the finder is built into the camera body, it is desirable that its size is small, and that nonetheless its form allows a predetermined ratio of change of the magnification to be obtained with ease.

According to the invention, therefore, when the picture area on the photosensitive surface of the photographic system is changed, for example, from the full size to the half size, the size of the frame for the field of view of the finder is made to alter, for example, to become small automatically, while simultaneously inserting a converter lens having a predetermined optical performance into a portion of the finder system, in this manner despite the change of the picture area, correct framing can always be recognized by the finder system, while nevertheless permitting the field of view of the finder to be observed with preservation of good optical performance. An embodiment of such a variable magnification finder device is described below. The embodiment illustrated here is a finder having an objective lens group 1 for forming a first object image 4, an erector lens group 2 receptive of the light from the first object image 4 for forming a second object image 5 in the erected, non-reverse form on a plane near the frame of the viewfield of the finder, and an eyepiece lens group 3 for observing the second object image 5, wherein that frame of the viewfield of the finder is made to change, and a converter lens 7 is introduced to the front of the eyepiece lens group 3 to change the observed magnification of the frame of the viewfield of the finder.

Particularly when the invention is applied to the case that the aforesaid frame of the viewfield of the finder scales down, the aforesaid converter lens is constructed with a single lens of positive refractive power to enlarge the observed magnification of the frame of the viewfield of the finder, and the following conditions are set forth:

$$-3 < fe - fet + (d_1/n) - d_1 < 3 \quad (10)$$

$$0.002 < d_2/fe < 0.5 \quad (11)$$

$$1.1 < fe/fet < 2 \quad (12)$$

where fe is the focal length of the eyepiece lens group 3, fet is the overall focal length of the eyepiece lens group 3 and the converter lens 7, $d_1$ and n are respectively the axial thickness and the refractive index of the material of the converter lens 7, and $d_2$ is the interval between the converter lens 7 and the eyepiece lens group 3. Incidentally, the unit of the inequalities (10) is "mm".

FIG. 19 is schematic diagrams of the main parts, illustrating the paraxial optical arrangement of an embodiment of the variable magnification finder according to the invention.

The diagram (A) shows an optical arrangement when shooting with the normal format of the photographic system, for example, the 35 mm full size.

The diagram (B) shows another optical arrangement when shooting with a half of the normal format, or the so-called half size.

In the figure, a reference numeral 1 denotes an objective lens group for forming a first image of an object to be photographed (not shown) on a first image plane 4. The objective lens 1 has a lens system of fixed focal length or a variable magnification lens group.

An erector lens group 2 has a lens system of fixed focal length or a variable magnification lens group and forms, with light from the first object image formed on the first image plane, a second object image on a second image plane 5 in the erected, non-reverse form. Frames 5a and 5b each define the field of view of the finder. Of these, the frame 5a of the viewfield of the finder has an opening for normal format photography (35 mm full size). The frame 5b of the viewfield of the finder has a smaller opening for the half size format photography than that of the frame 5a of the viewfield of the finder.

An eyepiece lens group 3 is used to observe the secondary object image formed on the secondary image plane 5. A converter lens 7 is releasably inserted in front of the eyepiece lens 3.

In the present embodiment, when altering the picture area on the photosensitive surface of the photographic system from the normal format of the 35 mm full size to the half format of the half size by, for example, selector means provided on the camera housing, the finder viewfield frame 5a is made to be automatically replaced by the finder viewfield frame 5b of smaller opening than that of the former. It is to be noted that instead of exchanging the finder viewfield frame, its opening shape may be changed to change its size. It is well-known how to define means for changing the size of the frame of the field of view in the finder. For example, one mechanism is illustrated at p. 188 of the Japanese language book "Dictionary of Camera and Lenses", that was published on Oct. 10, 1981 by Nippon Camera K.K.

By this, it is made possible that a finder image of the same framing as that of the image formed on the photosensitive surface by the photographic system.

Along with that, the converter lens 7 of positive refractive power also is inserted into and seated in front of the eyepiece lens group 3 so that the apparent refractive power of the eyepiece lens group 3 is strengthened to increase the observed magnification of the finder viewfield frame 5b. Thus, the size of the finder viewfield frame to be observed is maintained almost constant between before and after the picture format alters.

By this, the finder image can be made to observe in good condition.

Particular consideration is made in the present invention on the focal lengths (refractive powers) of the converter lens 7 and the eyepiece lens group 3, the form of the converter lens 7 to a singlet and the design rules for its curvatures and thickness as defined by the above-described inequalities of condition, thereby giving advantages that the change of the aberrations between before and after the alteration is minimized, and at the same time the change of the diopter of the finder is minimized by maintaining constant the length of optical path as measured mechanically and shortening the length of optical path as measured optically.

It should be noted that if, in the present embodiment, the photographic system consists of a variable magnification system, the variable magnification lens group in the objective lens group 1 or the erector lens group 2 is moved to vary the finder image magnification in response to variation of the photographic image magnification.

Next, the technical significance of each of the above-described conditions is explained.

The inequalities of condition (10) are to minimize the change of the diopter of the finder when the magnification of the viewfield of the finder is altered by inserting the converter lens 7. When the upper limit is exceeded, the change of the finder diopter increased to the positive direction. When the lower limit is exceeded, it increases in the negative direction. So, it is no good.

The inequalities of condition (11) are to obtain the observed magnification of the finder as changed to when the converter lens 7 is inserted, or the so-called ratio of change of the magnification, with good efficiency.

When the upper limit is exceeded, the interval between the converter lens 7 and the eyepiece lens group 3 is too wide so that it becomes difficult to obtained the predetermined ratio of change of the magnification. When the lower limit is exceeded, the operating mechanism for the converter lens 7 becomes difficult to construct in simple form.

The inequalities of condition (12) are to achieve a minimization of the size of the whole finder system and at the same time advantageously obtain the predetermined ratio of change of the magnification. When the upper limit is exceeded, the ratio of change of the magnification becomes large, but the size of the finder system is increased objectionably. When the lower limit is exceeded, it becomes difficult to obtain the predetermined ratio of change of the magnification.

FIGS. 20(A) to 20(D) are lens block diagrams of a numerical example 9 to be described later of the variable magnification finder of the invention.

In the present embodiment, variation of the magnification is performed by moving the objective lens group 1 and the erector lens group 2 toward the object side.

Figure 20A:
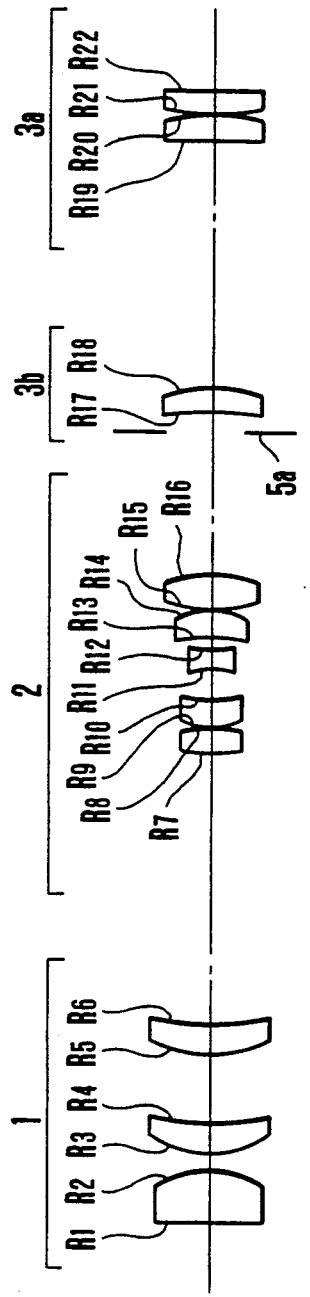
FIGS. 20(A) to 20(D) and FIGS. 21(A) to 21(D) are lens block diagrams and aberration curves of numerical embodiments of the invention. In these figures, FIGS. 20(A) and 21(A); and 20(B) and 21(B) are at the wide-angle end when shooting with the normal format and with the half-size format, and FIGS. 20(C) and 21(C); and 20(D) and 21(D) are at the telephoto end when with the normal format and with the half-size format.
Figure 20B:
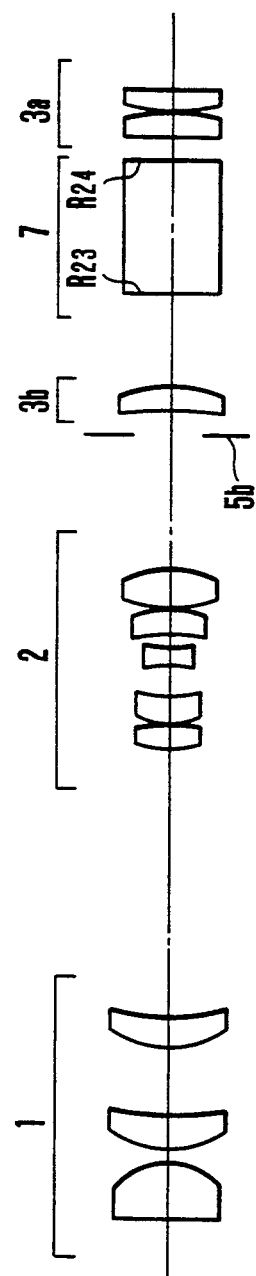

FIGS. 20(A) and 20(B) show the finder system in the wide-angle end setting at the time of the normal picture format and at the time of the half size picture format with the converter lens 7 inserted respectively.

Figure 20C:
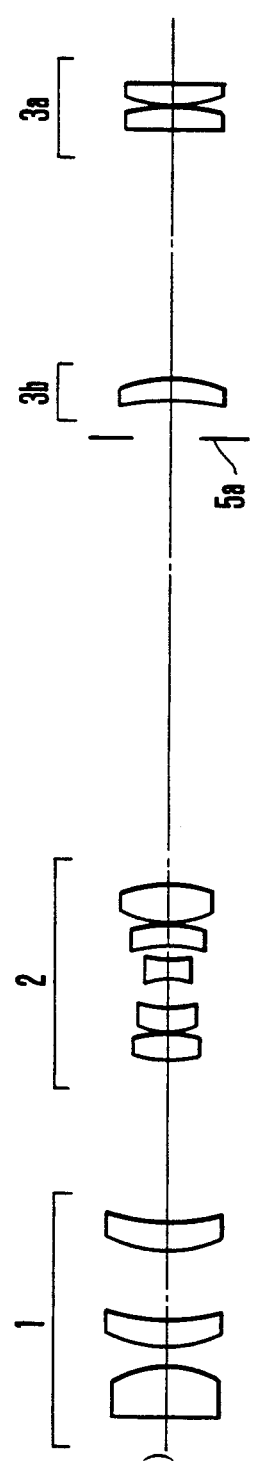
Figure 20D:
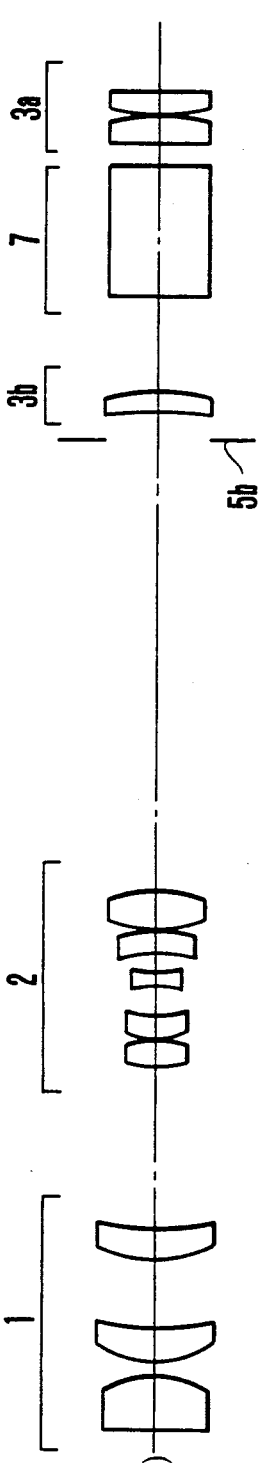
Figure 21A:
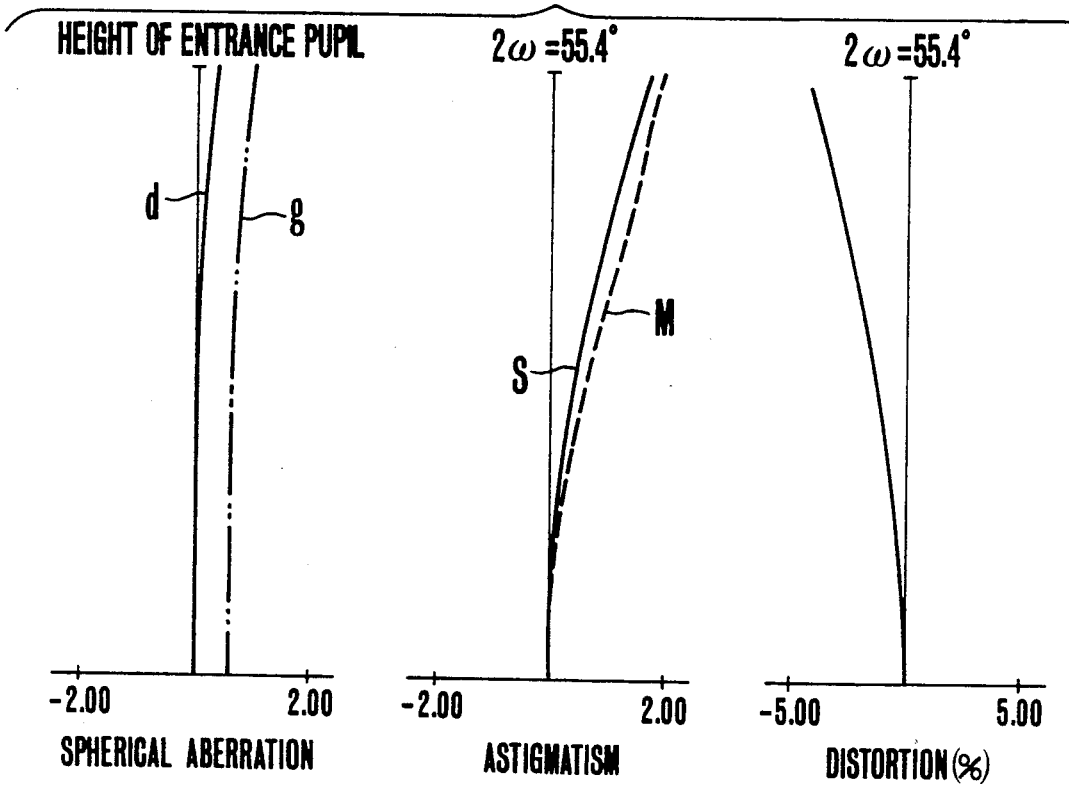
Figure 21B:
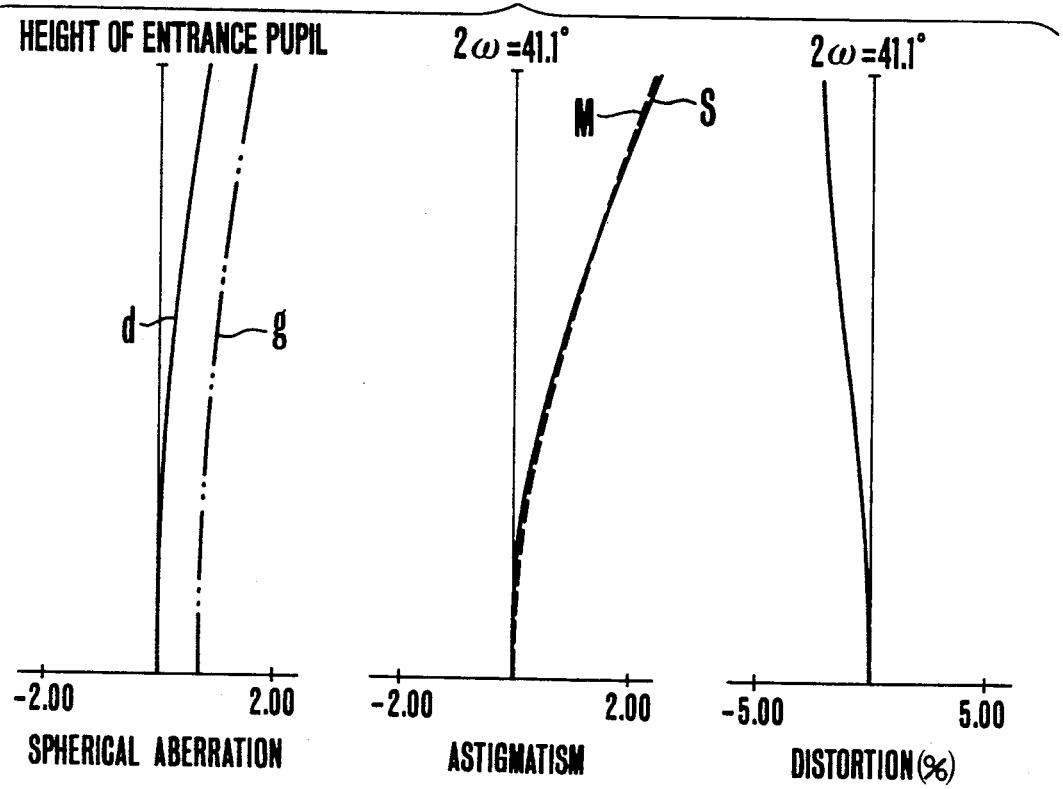
Figure 21C:
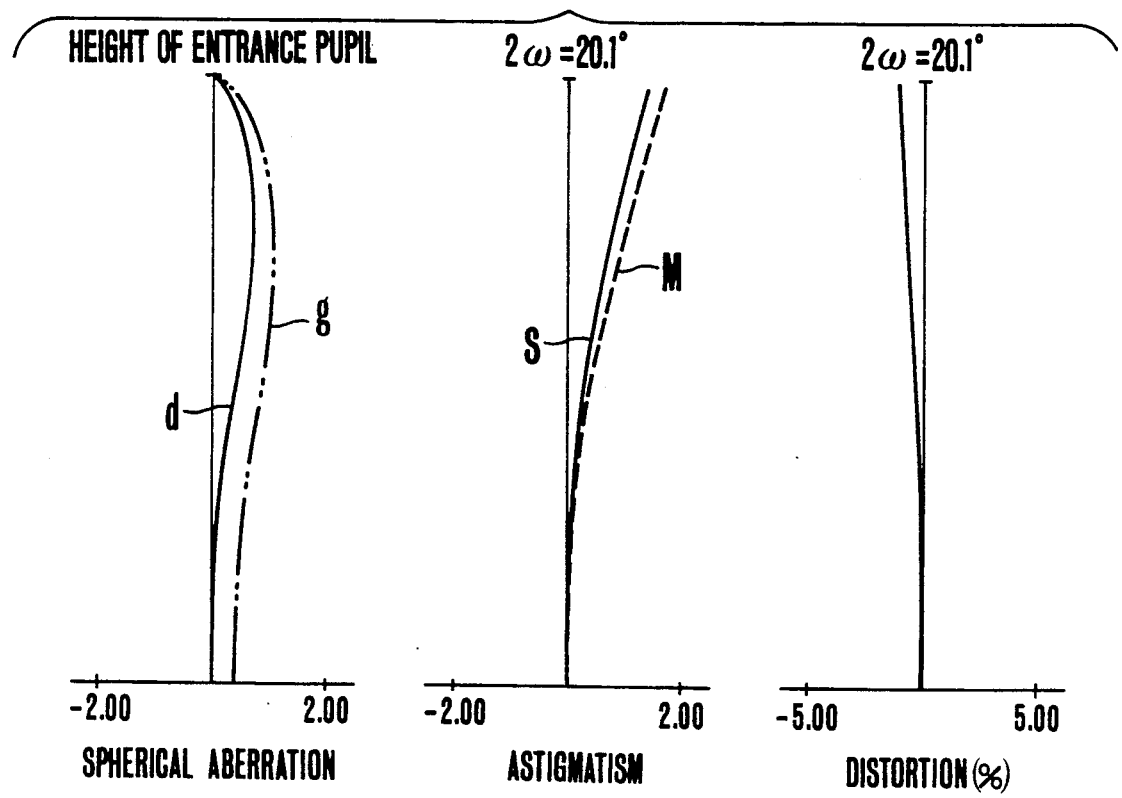
Figure 21D:
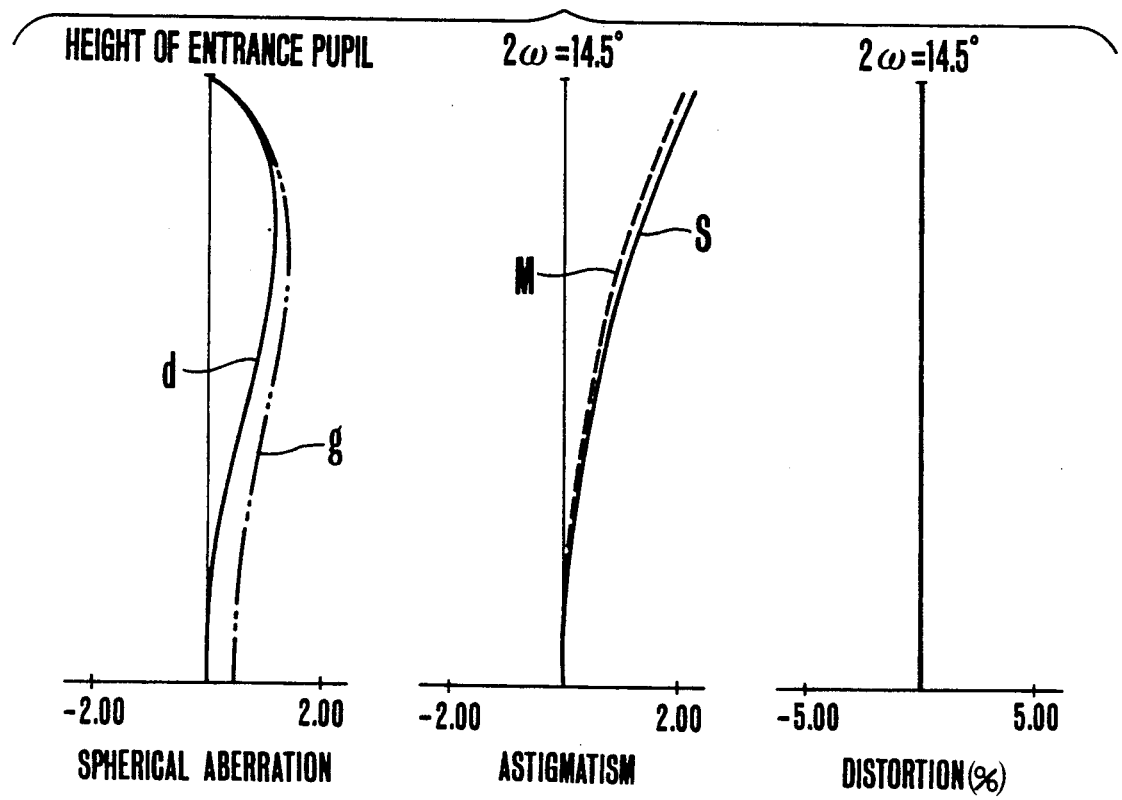

FIGS. 20(C) and 20(D) show the finder system when set in the telephoto end for the normal format and the half size format with the converter lens 7 inserted respectively.

In the figures, the same elements as those shown in FIG. 19 are denoted by the same reference numerals.

Incidentally, a reference character 3b denotes a field lens positioned adjacent the secondary image plane.

In the present embodiment, the objective lens is constructed with three positive lenses, the erector lens group 2 is constructed with two positive lenses, a negative lens and two positive lenses, totaling five lenses, and the eyepiece lens group 3a is constructed with two positive lenses.

In the following, the numerical example 9 of the invention is shown. In the numerical example 9, Ri represents the radius of curvature of the i-th lens surface counting from the object side, Di the i-th lens thickness or air separation counting from the object side, and Ni and $\nu i$ the refractive index and Abbe number of the glass of the i-th lens counting from the object side respectively.

In Table-3, other numerical examples 10 to 14 of the converter lens 7 are shown. Incidentally, in Table-3, Z represents the ratio of change of the magnification. In Table-4, there is shown the relationship between each of the above-described practical examples 10 to 14 and the conditions (10) to (12).

Incidentally, the unit of the R and D in all the numerical examples concerning the invention is "mm".

| Numerical Example 9 (FIGS. 20(A) to 20(D) and 21(A) to 21(D)): For Normal Format Photography: $2\omega = 55.4° - 20.1°$ | | | |
|---|---|---|---|
| R1 = −91.27 | D1 = 5.81 | N1 = 1.48749 | $\nu 1$ = 70.2 |
| R2 = −9.41 | D2 = 1.86 | | |
| R3 = 12.87 | D3 = 3.51 | N2 = 1.51633 | $\nu 2$ = 64.1 |
| R4 = 28.88 | D4 = 7.19 | | |
| R5 = 13.11 | D5 = 3.47 | N3 = 1.77250 | $\nu 3$ = 49.6 |
| R6 = 27.35 | = 29.65-17.92 | | |
| R7 = 15.39 | D7 = 2.50 | N4 = 1.71300 | $\nu 4$ = 53.8 |
| R8 = −26.85 | D8 = 0.20 | | |
| R9 = 9.36 | D9 = 3.00 | N5 = 1.60311 | $\nu 5$ = 60.7 |
| R10 = 14.86 | D10 = 3.05 | | |
| R11 = −11.50 | D11 = 2.00 | N6 = 1.84666 | $\nu 6$ = 23.9 |
| R12 = 8.59 | D12 = 1.43 | | |
| R13 = −17.78 | D13 = 3.00 | N7 = 1.60311 | $\nu 7$ = 60.7 |
| R14 = −10.27 | D14 = 0.20 | | |
| R15 = 19.01 | D15 = 4.00 | N8 = 1.48749 | $\nu 8$ = 70.2 |
| R16 = −13.42 | D16 = 17.59-51.70 | | |
| R17 = −106.87 | D17 = 2.65 | N9 = 1.50137 | $\nu 9$ = 56.4 |
| R18 = −18.00 | D18 = 27.10 | | |
| R19 = 200.30 | D19 = 2.50 | N10 = 1.50137 | $\nu 10$ = 56.4 |
| R20 = −34.73 | D20 = 0.30 | | |
| R21 = 34.73 | D21 = 2.50 | N11 = 1.50137 | $\nu 11$ = 56.4 |
| R22 = −200.30 | | | |

| For Half Size Format Photography: $2\omega = 41.1° - 14.5°$ | | | |
|---|---|---|---|
| R1 = −91.27 | D1 = 5.81 | N1 = 1.48749 | $\nu 1$ = 70.2 |
| R2 = −9.41 | D2 = 1.86 | | |
| R3 = 12.87 | D3 = 3.51 | N2 = 1.51633 | $\nu 2$ = 64.1 |
| R4 = 28.88 | D4 = 7.19 | | |
| R5 = 13.11 | D5 = 3.47 | N3 = 1.77250 | $\nu 3$ = 49.6 |
| R6 = 27.35 | D6 = 29.65-17.92 | | |
| R7 = 15.39 | D7 = 2.50 | N4 = 1.71300 | $\nu 4$ = 53.8 |
| R8 = −26.85 | D8 = 0.20 | | |
| R9 = 9.36 | D9 = 3.00 | N5 = 1.60311 | $\nu 5$ = 60.7 |
| R10 = 14.86 | D10 = 3.05 | | |
| R11 = −11.50 | D11 = 2.00 | N6 = 1.84666 | $\nu 6$ = 23.9 |
| R12 = 8.59 | D12 = 1.43 | | |
| R13 = −17.78 | D13 = 3.00 | N7 = 1.60311 | $\nu 7$ = 60.7 |
| R14 = −10.27 | D14 = 0.20 | | |
| R15 = 19.01 | D15 = 4.00 | N8 = 1.48749 | $\nu 8$ = 70.2 |
| R16 = −13.42 | = 17.59-51.70 | | |
| R17 = −106.87 | D17 = 2.65 | N9 = 1.50137 | $\nu 9$ = 56.4 |
| R18 = −18.00 | D18 = 27.10 | | |
| R19 = 200.30 | D19 = 2.50 | N10 = 1.50137 | $\nu 10$ = 56.4 |
| R20 = −34.73 | D20 = 0.30 | | |

-continued

| | | | | | |
|---|---|---|---|---|---|
| R21 = 34.73 | D21 = 2.50 | N11 = 1.50137 | v11 = 56.4 | | |
| R22 = −200.30 | | | | | |
| R23 = 63.98 | D23 = 15.00 | N12 = 1.50137 | v12 = 56.4 | | |
| R24 = −63.98 | D24 = 2.00 | | | | | fe − fet + d$_1$/n − d$_1$ = 1.72, d$_2$/fe = 0.069, fe/fet = 1.30

TABLE-3

| Numerical Example | R23 | R24 | N | vd | d$_1$ | Z |
|---|---|---|---|---|---|---|
| 10 | 30 | −30 | 1.77249 | 49.6 | 22.9 | 1.73 |
| 11 | 0 | −100 | 1.77249 | 49.6 | 9.33 | 1.17 |
| 12 | 0 | −50 | 1.77249 | 49.6 | 16.07 | 1.36 |
| 13 | 40 | −40 | 1.51633 | 64.15 | 19.36 | 1.41 |
| 14 | 80 | −80 | 1.51633 | 64.15 | 13.16 | 1.23 |

TABLE-4

| Numerical Example | Factor in Condition | | |
|---|---|---|---|
| | (10) fe-fet-d$_1$/n-d$_1$ | (11) d$_2$/fe | (12) fe/fet |
| 10 | 2.24 | 0.069 | 1.73 |
| 11 | 0.14 | 0.069 | 1.17 |
| 12 | 0.66 | 0.069 | 1.36 |
| 13 | 1.83 | 0.069 | 1.41 |
| 14 | 0.94 | 0.069 | 1.23 |

As has been described above, according to the present embodiment, the size of the frame for the field of view of the finder is altered and the converter lens is set in a predetermined position in response to alteration of the picture format on the photosensitive surface of the photographic system, whereby the finder image can be observed with the same framing as that of the photographic image while nevertheless leaving the size of the field of view of the finder almost unchanged after the alteration, and moreover with the limitation of the change of the diopter of the finder after the alteration to a minimum. Thus, a variable magnification finder having such features realized in simple form of construction can be achieved.

What is claimed is:

1. A finder device of the real image type that is capable of zooming comprising:
   a first lens group having a positive refractive power to form a first image;
   a second lens group having a positive refractive power to re-form said first image; and
   an eyepiece lens group having a positive refractive power for observing an image formed by said second lens group, wherein zooming is performed by moving said first and second lens groups according to different loci of motion to each other.

2. A finder device according to claim 1, satisfying the following condition:

$$0.5 < -\beta_T < 8$$

where $\beta_T$ is an image magnification of said second lens group in a telephoto end.

3. A finder device according to claim 1 or 2, satisfying the following condition:

$$0.1 < fo/fe < 2.0$$

where fo and fe are focal lengths of said first lens group and said eyepiece lens group.

4. A finder device according to claim 1, satisfying the following condition:

$$0.9 < M_1/(b_T(f_{AT}/(f_{AT}-b_T)-1)-b_W(f_{AW}/(f_{AW}-b_W)-1)) < 1.1$$

where $M_1$ is the amount of movement of said first lens group from the wide-angle end to the telephoto end, $f_{AW}$ and $f_{AT}$ are focal lengths of said second lens group at the wide-angle end and the telephoto end respectively, and $b_W$ and $b_T$ are distances from said first image to front principal point of said second lens group in the wide-angle end and the telephoto end respectively.

5. A finder device according to claim 1 or 4, satisfying the following condition:

$$3 < f_{AW} \cdot \tan \omega < 40$$

where $f_{AW}$ is a focal length of said second lens group in the wide angle end, and $\omega$ is the half-angle of view in the wide angle end, wherein the unit is mm.

6. A finder device according to claim 1 or 4, satisfying the following condition:

$$0.1 < -\beta_W < 1$$

$$1 < -\beta_T < 7$$

where $\beta_W$ and $\beta_T$ are image magnifications of said second lens group in the wide-angle end and the telephoto end respectively.

7. A finder device according to claim 1 or 4, satisfying the following condition:

$$0.1 < fo/fe < 3.0$$

where fe and fo are focal lengths of said eyepiece lens group and said first lens group respectively.

8. A finder device according to claim 1, wherein said second lens group comprises, from front to rear, positive, negative and positive lenses, and satisfies the following condition:

$$(Rn2+Rn1)/(Rn2-Rn1) < -0.35$$

where Rn1 and Rn2 are radii of curvature of the front and rear surfaces of said negative lens respectively.

9. A finder device according to claim 8, satisfying the following condition:

$$23 < vn < 40$$

where $vn$ is an Abbe number of a material from which said negative lens is made.

10. A finder device according to claim 1, further comprising conversion lens means to be attached in front of said eyepiece lens group.

11. A finder device according to claim 10, satisfying the following condition:

$$-3 < fe - fet + (d_1/n) - d_1 < 3$$

where fe is a focal length of said eyepiece lens group, fet is a composite focal length of said eyepiece lens group and said conversion lens means, and $d_1$ and n are an axial thickness and a refractive index of a material of said conversion lens means respectively, wherein the unit is mm.

12. A finder device according to claim 11, satisfying the following condition:

$$0.002 < d_2/fe < 0.5$$

$$1.1 < fe/fet < 2$$

where $d_2$ is a separation between said conversion lens means and said eyepiece lens group.

13. A finder device comprising a first lens group for forming a first object image concerning an object to be photographed, a second lens group for forming, from said first object image, an erected, non-reverse second object image proximate to a frame defining a size to a field of view of the finder, an eyepiece lens group for observing said second object image, means for changing the size of said frame defining the field of view of the finder, and a conversion lens group attachable to a front of said eyepiece lens group in response to movement of said means to change the size of said frame defining the field of view of the finder.

14. A finder device according to claim 13, wherein when reducing said frame defining the field of view of the finder, said conversion lens group is constructed with a single lens of positive refractive power so that the observed magnification of said frame of the field of view of the finder is enlarged, and the following conditions are satisfied:

$$-3 < fe - fet + (d_1/n) - d_1 < 3 \quad (1)$$

$$0.002 < d_2/fe < 0.5 \quad (2)$$

$$1.1 < fe/fet < 2 \quad (3)$$

where fe is a focal length of said eyepiece lens group, fet is a composite focal length of said eyepiece lens group and said conversion lens group, $d_1$ and n are respectively an axial thickness and a refractive index of a material of said conversion lens group, and $d_2$ is a separation between said conversion lens group and said eyepiece lens group, the unit of the inequalities (1) being mm.

* * * * *

UNITED STATES PATENT AND TRADEMARK OFFICE
CERTIFICATE OF CORRECTION

PATENT NO. : 5,055,868

DATED : October 8, 1991

INVENTOR(S) : YOSHINORI ITOH, ET AL.

It is certified that error appears in the above-identified patent and that said Letters Patent is hereby corrected as shown below:

IN THE ABSTRACT:

Column [56], "Korprelian" should read --Kaprelian--.

Column 1:

Line 60, "that" should be deleted.

Line 64, "example." should read --example,--.

Column 2:

Line 10, "group" should read --groups--.

Line 27, "elector" should read --erector--.

Column 3:

Line 8, "13(B)" should read --13(C)--.

Line 23, "schematic diagrams" should read --a schematic diagram--.

Line 33, "when" should read --when shooting--.

Line 59, "constant" should read --constant.--

Column 4:

Line 23, "$F_{AT}$" should read --$f_{AT}$--.

Line 41, "of" should read --$fo$--.

Line 47, "with" should be deleted.

Line 53, "with" should be deleted.

UNITED STATES PATENT AND TRADEMARK OFFICE
CERTIFICATE OF CORRECTION

PATENT NO. : 5,055,868

DATED : October 8, 1991

INVENTOR(S) : YOSHINORI ITOH, ET AL.

It is certified that error appears in the above-identified patent and that said Letters Patent is hereby corrected as shown below:

Column 5:
    Line 42, "symmetry" should read --symmetrical--.
    Line 51, "this" should read --it--.
    Line 52, "remove" should read --remove it--.

Column 6:
    Line 22, "N10=1.48171" should read --N10=1.49171--.

Column 7:
    Line 30, "groups 2" should read --group 2--.
    Line 43, "wide angle-end," should read --wide-angle end,--.
    Line 47, "used as" should be deleted.
    Line 50, "first a" should read --a first-- and "used as" should be deleted.

Column 8:
    Line 26, "with" should be deleted.

Column 9:
    Line 48, "-6.2060-08" should read -- -6.206CD-08--.

UNITED STATES PATENT AND TRADEMARK OFFICE
CERTIFICATE OF CORRECTION

PATENT NO. : 5,055,868

DATED : October 8, 1991

INVENTOR(S) : YOSHINORI ITOH, ET AL.

It is certified that error appears in the above-identified patent and that said Letters Patent is hereby corrected as shown below:

Column 11:
    Line 11, "whole" should read --as a whole--.
    Line 15, "material" should read --material--.
    Line 19, "with" should be deleted.
    Line 61, "equation" should read --equation:--.

Column 13:
    Line 45, "system, in" should read --system. In--.

Column 14:
    Line 14, "schematic diagrams" should read --a schematic diagram--.
    Line 61, "as" should read --is--.

Column 15:
    Line 40, "obtained" should read --obtain--.

Column 16:
    Line 36, "=29.65-17.92" should read --D6=29.65-17.92--.
    Line 65, "=17.59-51.70" should read --D16=17.59-51.70--.
    Line 67, "D18=27.10" should read --D18=10.10--.

UNITED STATES PATENT AND TRADEMARK OFFICE
CERTIFICATE OF CORRECTION

PATENT NO. : 5,055,868

DATED : October 8, 1991

INVENTOR(S) : YOSHINORI ITOH, ET AL.

It is certified that error appears in the above-identified patent and that said Letters Patent is hereby corrected as shown below:

<u>Column 18</u>:

Line 23, "condition:" should read --conditions:--.

<u>Column 19</u>:

Line 2, "condition:" should read --conditions:--.

Signed and Sealed this

Eighteenth Day of May, 1993

Attest:

MICHAEL K. KIRK

Attesting Officer — Acting Commissioner of Patents and Trademarks